United States Patent
Tosaki

[19]
[11] Patent Number: 5,844,530
[45] Date of Patent: Dec. 1, 1998

[54] HEAD MOUNTED DISPLAY, AND HEAD MOUNTED VIDEO DISPLAY SYSTEM

[75] Inventor: Kenji Tosaki, Tokyo, Japan

[73] Assignee: Kabushiki Kaisha Sega Enterprises, Tokyo, Japan

[21] Appl. No.: 568,824

[22] Filed: Dec. 7, 1995

[30] Foreign Application Priority Data

Dec. 9, 1994 [JP] Japan .................................. 6-306723
Dec. 9, 1994 [JP] Japan .................................. 6-306724

[51] Int. Cl.⁶ .................................................. G09G 5/00
[52] U.S. Cl. .................................................. 345/8; 345/7
[58] Field of Search .................................. 345/8, 7, 9

[56] References Cited

U.S. PATENT DOCUMENTS

| | | |
|---|---|---|
| 3,787,109 | 1/1974 | Vizenor . |
| 3,923,370 | 12/1975 | Mostrom . |
| 4,315,240 | 2/1982 | Spooner ..................................... 345/8 |
| 4,600,271 | 7/1986 | Boyer et al. . |
| 5,034,809 | 7/1991 | Katoh ....................................... 358/88 |
| 5,089,914 | 2/1992 | Prescott ................................... 359/815 |
| 5,153,569 | 10/1992 | Kawamura et al. ...................... 345/8 |
| 5,266,930 | 11/1993 | Ichikawa et al. ......................... 345/8 |
| 5,281,957 | 1/1994 | Schoolman ................................ 345/8 |
| 5,353,134 | 10/1994 | Michel et al. ............................ 359/52 |
| 5,414,544 | 5/1995 | Aoyagi et al. ........................... 359/53 |
| 5,451,976 | 9/1995 | Ito ............................................... 345/8 |
| 5,457,641 | 10/1995 | Zimmer et al. ........................ 364/559 |
| 5,485,172 | 1/1996 | Sawachika et al. ....................... 345/8 |
| 5,579,026 | 11/1996 | Tabata ....................................... 345/8 |

FOREIGN PATENT DOCUMENTS

| | | |
|---|---|---|
| 0438362A1 | 7/1991 | European Pat. Off. . |
| 0511154A2 | 10/1992 | European Pat. Off. . |
| 0627850A1 | 12/1994 | European Pat. Off. . |
| 0643314A2 | 3/1995 | European Pat. Off. . |
| 0660154A1 | 6/1995 | European Pat. Off. . |
| 0675382A1 | 10/1995 | European Pat. Off. . |
| 57-182541 | 11/1982 | Japan . |
| 62-31531 | 2/1987 | Japan . |
| 1-133479 | 5/1989 | Japan . |
| 3-191389 | 8/1991 | Japan . |
| 4-347011 | 12/1992 | Japan . |
| 2201069 | 8/1988 | United Kingdom . |
| 2 266 428 | 10/1993 | United Kingdom . |
| 2266428 | 10/1993 | United Kingdom . |
| WO95/11473 | 4/1995 | WIPO . |

OTHER PUBLICATIONS

UK Search Report dated Aug. 14, 1996 for GB 9525203.7 (claims 14 and 15).
UK Search Report dated Aug. 15, 1996 for GB 9525023.7 (claim 23).
UK Search Report dated Aug. 15 1996 for GB 9525203.7 (claim 26).
UK Search Report dated Aug. 14, 1996 for GB 9525203.7 (claim 20).
UK Search Report dated Aug. 14,1996 for GB 9525203.7 (claims 16–19).
Great Britain patent search report dated Mar. 26, 1996 for Great Britain Application No. 9525203.7.

*Primary Examiner*—Matthew Luu
*Attorney, Agent, or Firm*—Finnegan, Henderson, Farabow, Garrett & Dunner, L.L.P.

[57] ABSTRACT

A head mounted display comprises a transmission-type display device for displaying prescribed images while transmitting outside light, a head mounted device for supporting the display device in front of the face, and a visor for reducing the quantity of outside light incident on the display device. The visor is installed in such a way that it can move between a position in which the outside front surface of the display device is covered and a position in which this surface is open. A living space or other external environment can be perceived without any impediment to viewing even when the images projected on the image display mechanism are being viewed.

23 Claims, 24 Drawing Sheets

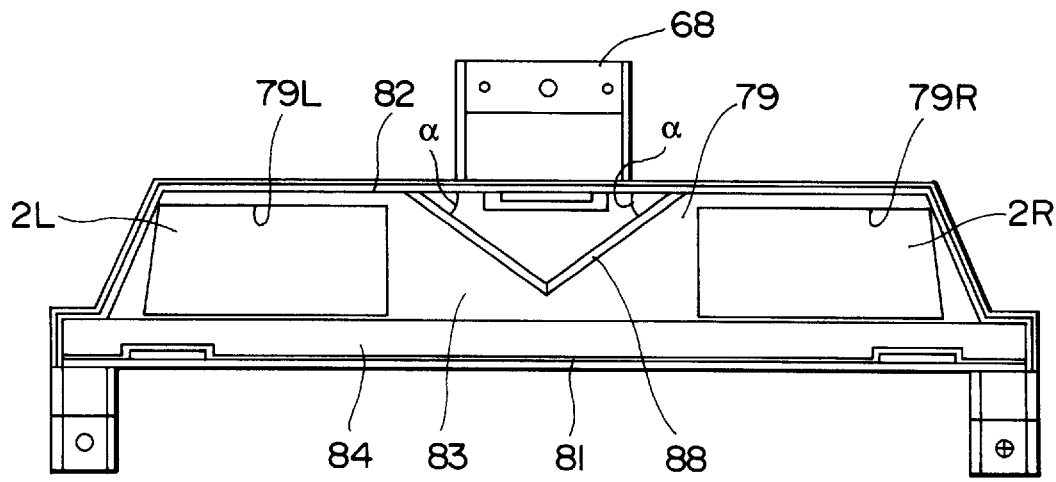
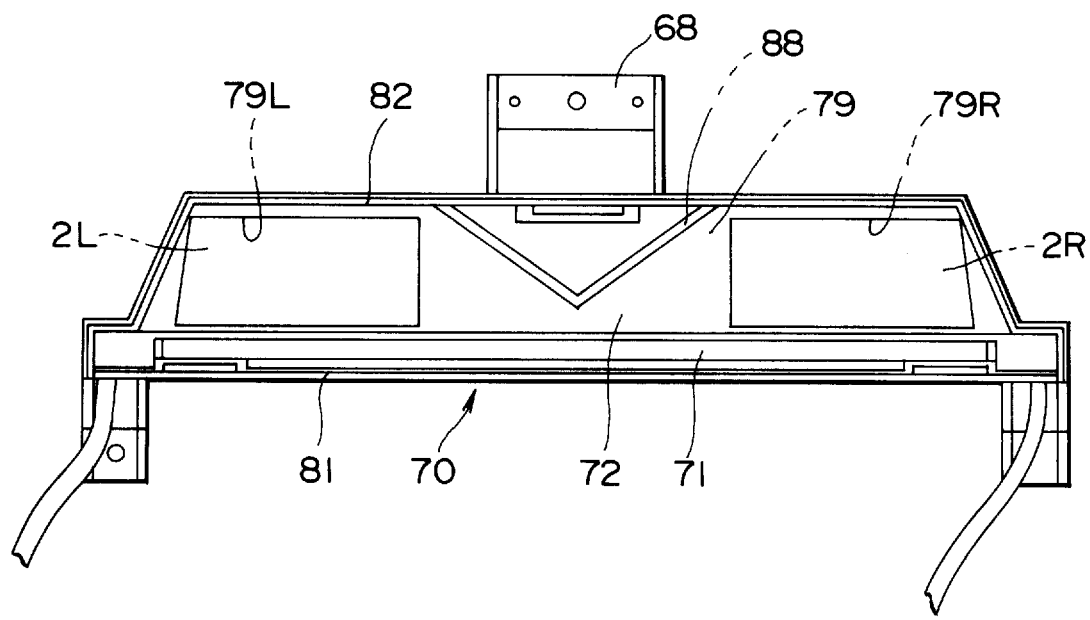

HEAD MOUNTED DISPLAY, AND HEAD MOUNTED VIDEO DISPLAY SYSTEM

BACKGROUND OF THE INVENTION

1. Field of the Invention

The present invention relates to a head mounted video display and a head mounted video display system, and more particularly to a head mounted display and a head mounted video display system equipped with two display mechanisms in proximity with the right and left eyes.

2. Description of Prior Art

Recent advances in computer graphics have resulted in the development of a new technological field called "virtual reality," that is, an artificial environment synthesized by a computer. In this field of virtual reality, head mounted displays (hereinafter "HMDs") are often used as visual displays. HMDs are used, for example, for playing games in a virtual three-dimensional space, for simulating the interior of a building, and in various other fields. Generally, an HMD comprises a small liquid-crystal display (hereinafter "an LCD") for displaying images, an optical system for guiding the images projected on this LCD toward both eyes, and position sensors for detecting the position and direction of the head. The computer connected to the HMD determines the position and direction of the head in accordance with signals from the position sensors, and presents the LCD with video signals that correspond to the position and direction of the head. This allows the user wearing an hmd to experience the same sensation as when scanning a wide three-dimensional space.

With the above-mentioned HMD, for example, a display device is placed in front, this display device is supported with a headband or the like, and this headband is attached to the head of the player, fixing the above-mentioned display device on the head. There are also types which allow the display device to be securely fixed on the head by replacing the above-mentioned headband with a slide-type frame and adjusting the length of the above-mentioned frame.

In addition, an HMD commonly has a structure that surrounds the ears or eyes of the player when worn. A player wearing this is therefore isolated from the external environment and is allowed to concentrate his or her attention on the images projected on the display device.

Such HMDs have the following drawbacks, however.

First, isolation from the external environment is possible and attention can be concentrated on the images, but it is difficult to be aware of (to see) the external environment when viewing the images. Such impaired awareness of the external environment during image viewing does not pose any particular problems when, for example, a chair designed for exclusive use by the player is prepared and the player views the images while sitting in this chair, as is the case at an amusement park or the like, and in other cases in which a play position for exclusive use by the player is secured. By contrast, when an HMD is used, for example, at home or in another living space, it is desirable to be able to view the images and at the same time to be aware of the external environment and to obtain current information about the surroundings without any adverse effect being produced on HMD functions, that is, on the clarity of the images being viewed, on concentration and viewing abilities, or on any other function.

Second, no consideration has been given to the angle between the line of sight and the display means. Generally, people often direct their line of sight downward from the horizontal direction under natural conditions. In conventional HMDs, however, display means are placed horizontally with respect to the eyes, forcing the user to consciously direct his or her line of sight in the horizontal direction. In addition, when the user wears glasses, the downwardly tilted glasses sometimes come into contact with the display means. To avoid this situation, the display means should be placed at a distance from the eyes, but a considerable distance between the display means and the eyes creates a new drawback: the narrow angle of view of the eyes with respect to the display means. Specifically, the drawback is that the images projected on the eyes of the user are smaller, detracting from the realism of a TV game or the like.

Third, the eyesight of some HMD wearers makes it impossible to obtain focused images. Specifically, because conventional HMDs have no focus adjustment mechanisms, images cannot be brought into focus in accordance with the eyesight of the wearer.

Four, it is difficult to make colorful image presentations. Because the optical system of a conventional HMD has a structure that blocks outside light, the user cannot perceive external images when wearing such an HMD. It is thus impossible to superpose images projected by the HMD on the images of the everyday environment. In addition, the images projected by the HMD are generated independently from the background of the everyday environment, so the HMD would be incapable of projecting images that correspond to the background of the everyday environment even if it were possible for the optical system to transmit outside light. The inevitable result is that conventional head mounted video display systems have a narrow scope of image presentation because of the inability to superpose the two types of images.

SUMMARY OF THE INVENTION

An object of the present invention is to provide an HMD that allows the user to be aware of the living space and other types of external environments even during the viewing of images projected on an image display mechanism, without adversely affecting the clarity of the images being viewed, the concentration and viewing abilities, or any other HMD function. Another object is to provide an HMD that allows the user to be fully aware of the external environment without removing the HMD from his or her head when it becomes necessary to be more alert of the external environment while viewing images.

Yet another object of the present invention is to provide an HMD capable of reducing user fatigue.

Still another object of the present invention is to provide consistently focused images.

An additional object of the present invention is to make colorful image presentation possible by blending images projected by an HMD with the images of the everyday environment.

Aimed at attaining the stated objects, the present invention comprises a transmission-type image display mechanism for displaying prescribed images while transmitting outside light, a support mechanism for supporting this image display mechanism in front of the face, and a light attenuation mechanism for reducing the quantity of outside light incident on the above-mentioned image display mechanism. The above-mentioned light attenuation mechanism is movably installed between a position in which it covers the outside front surface of the above-mentioned image display mechanism and a position in which it opens the outside front surface of the above-mentioned image display mechanism.

A transfer of the above-mentioned light attenuation mechanism to the open position is a rapid and simple way of ensuring full awareness of the external environment even during image viewing without requiring that the HMD be removed from the head. When under these conditions the light attenuation mechanism is nontransparent and is in the position in which the outside front surface of the image display mechanism is covered, it is possible to concentrate on viewing because no light enters the HMD from the outside. This allows the user to open the light attenuation mechanism and to become aware of the external environment when needed without adversely affecting immersion into the game, particularly when game images are presented by the image display mechanism. On the other hand, in the event that the above-mentioned light attenuation mechanism is transparent, the player can see the living space or another external environment through the image display mechanism and light attenuation mechanism without any adverse effect being produced on the viewing of the images projected on the image display mechanism, even when the above-mentioned light attenuation mechanism covers the outside front surface of the image display mechanism.

This shows that the transmissivity of the light attenuation mechanism may be a comparatively low value or a value at which the outside light is blocked completely. It is preferable for the transmissivity of this light attenuation mechanism to be such that, for example, the outlines of appliances, furniture, and other objects occupying a living space remain discernible when images are displayed by the image display mechanism. Such a transmissivity at the same time allows images from the image display mechanism to be vividly reproduced.

In addition, images projected on the image display mechanism can be made more distinct by reducing the quantity of outside light that reaches the eyes through the above-mentioned light attenuation mechanism to a level below the luminous energy that reaches the eyes from the light source of the above-mentioned image display mechanism. On the other hand, the external environment can be made more perceptible (more visible) by increasing the quantity of outside light that reaches the eyes to a level above the luminous energy that reaches the eyes from the above-mentioned light source when the light attenuation mechanism is open.

The movement of the above-mentioned light attenuation mechanism can be further simplified because the above-mentioned light attenuation mechanism can be moved by rotation up and down about two upper ends at the sides of the head.

Light radiated by a light source can be concentrated essentially in the central portion of the light guide plate of the above-mentioned image display mechanism by roughly shaping the light guide plate as a trapezoid in which the side close to the above-mentioned light source is shorter than the opposite side. This allows the light radiated by the light source toward a liquid-crystal display to be transmitted with satisfactory efficiency.

In addition, the light radiated by the light source toward the liquid-crystal display can be transmitted with an even higher efficiency by providing the above-mentioned image display mechanism with a diffusion plate for diffusing the light radiated by the light source and transmitting the light to liquid-crystal display means, and a reflector for reflecting the above-mentioned light toward the diffusion plate.

In addition, the above-mentioned image display mechanism is equipped with an outside light quantity detection means for detecting the quantity of outside light reaching the eyes, and with a luminous energy control means for controlling the luminous energy generated by the light source on the basis of data obtained by the above-mentioned outside light quantity detection means, thus securely yielding the above-mentioned action when the luminous energy of the site where the HMD is used is either very low or very high.

The above-mentioned light attenuation mechanism is also equipped with an outside light quantity detection means for detecting the quantity of outside light reaching the eyes, and with a transmissivity control means for controlling the transmissivity of the light attenuation mechanism on the basis of data obtained by the above-mentioned outside light quantity detection means, thus securely yielding the above-mentioned action irrespective of the luminous energy of the site where the HMD is used.

In addition, providing a movement detection means for detecting the movement state of the above-mentioned light attenuation mechanism and a light source lighting control means for controlling the lighting of the above-mentioned light source on the basis of data obtained by the above-mentioned movement detection means makes it possible to extinguish the light source of the image display mechanism when the light attenuation mechanism has been opened, and to light the above-mentioned light source when the outside front surface of the image display mechanism has been covered by the light attenuation mechanism. Therefore, when the light attenuation mechanism is opened and the external environment becomes visible, the user can be more aware of the external environment because a state is established in which no images are projected on the image display mechanism. On the other hand, when the outside front surface of the image display mechanism has been covered by the light attenuation mechanism, the user can view the vivid images because the above-mentioned light source is lighted.

Providing a movement detection means for detecting the movement condition of the above-mentioned light attenuation mechanism and a power control means for controlling power on/off on the basis of data obtained by the above-mentioned movement means also makes it possible to cut off power when the light attenuation mechanism has been opened and to establish a state in which power is switched on when the outside front surface of the image display mechanism has been covered by the light attenuation mechanism. It is therefore possible to halt the projection program for the image display mechanism and to eliminate images from the image display mechanism when the light attenuation mechanism has been opened and the external environment made visible, and to allow images to be projected on the image display mechanism, and the user to view vivid images, when the outside front surface of the image display mechanism has been covered by the light attenuation mechanism.

In addition, it is possible to make one fully aware of the external environment at regular intervals by providing a light attenuation mechanism opening means for opening the above-mentioned light attenuation mechanism on the basis of an arbitrarily set elapsed time. It is also possible to make one even more alert of the external environment at regular intervals by combining this light attenuation mechanism opening means with the above-mentioned movement detection means and light source lighting control means. It is also possible to make one even more alert of the external environment at regular intervals and to complete image viewing at regular intervals by combining this light attenuation mechanism opening means with the above-mentioned movement detection means and power control mean.

It is also possible to reduce the weight of the HMD because a headphone terminal and a volume adjustment component are provided to the above-mentioned support mechanism, viewing is performed with the aid of a headphone, and there is no need to provide the HMD itself with a headphone speaker. It is possible to simplify the operation of the volume adjustment component by installing the above-mentioned volume adjustment component in the front part of the support mechanism.

In the head mounted display device pertaining to the present invention, the display means (of the head mounted display) is installed along the line of sight that extends downward at a prescribed angle to the horizontal. Generally, a person can reduce his or her fatigue by tilting his or her line of sight downward from the horizontal direction rather than fixing it in the horizontal direction. The present invention therefore makes it possible for the user to reduce his or her fatigue despite wearing a head mounted display for a long time.

In addition, focusing can be performed freely by varying the distance between the display portion and the optical system with the aid of focus adjustment means. Specifically, the user can enjoy consistently focused images because the focus can be adjusted in accordance with the eyesight of the user.

The present invention also offers a position detection device and a picture generation device in order to create highly compelling images. The position detection device detects the position (including the angle) of the head mounted display and outputs the detection data. The picture generation device generates video signals in accordance with these positional data and sends them to a head mounted image device. This projects images corresponding to the position of the head mounted display onto the display mechanism of the head mounted display. Because the display mechanism can transmit light from the outside, it appears to the person wearing the head mounted display that the images projected on the display mechanism are blended with the surroundings. The present invention therefore allows the images displayed on the head mounted display to be superposed on the real images, creating a vivid visual reality. Let us assume, for example, that the present invention is used at a haunted house at an amusement part. In this case, projecting the images of a ghost on the head mounted display will make the player experience the sensation of the ghost appearing at the haunted house, making it possible to create realistic images.

On the basis of the positional data, the picture generation device generates video signals that correspond to the scenery outside the head mounted display. Therefore, in the above-mentioned example of a haunted house, images that correspond to the scenes inside the haunted house can be projected on the head mounted display as the player moves through the haunted house. Specifically, the present invention can create a more realistic image presentation.

In addition, the position detection device detects the position of the head mounted display and the position of a transport device, and outputs positional data. Based on these positional data, the picture generation device generates images that correspond to the positions of the transport device and the head mounted display. These images are projected on the head mounted display. In the above-mentioned example of a haunted house, therefore, the player can enjoy images that correspond to the scenes of the haunted house while moving together with the transport device through the haunted house.

A display device may also be installed in front of the head mounted display. A picture generation device generates video signals that correspond to the images displayed by an image device. In an example in which a TV receiver is used as the display device, battle scenes of a shooting game can be displayed on the TV receiver, and a cockpit of a fighter aircraft on the head mounted display. Specifically, the battle scenes are displayed at a position away from the player, and the cockpit is displayed directly in front of the player. This allows the creation of images that appear to have depth.

The picture generation device can also send separate video signals to a plurality of head mounted displays. This allows different images to be projected on the plurality of head mounted displays. When, for example, a plurality of players are enjoying a shooting game in front of a large screen, individual scores can be projected on the head mounted displays of the corresponding players. The present invention allows a plurality of players to participate in the same game while looking at the screen (display device), and can provide each player with unique images (information).

BRIEF DESCRIPTION OF THE DRAWINGS

FIG. 7 is a plan view showing a portion of the display device of the HMD shown in FIG. 1;

FIG. 8 is a plan view showing a portion of the display device of the HMD shown in FIG. 1;

DETAILED DESCRIPTION OF THE PREFERRED EMBODIMENTS

Embodiments pertaining to the present invention will now be described with reference to drawings.

(First Embodiment)

An HMD 1 shown in FIGS. 1 through 9 comprises a display device 2, which is an image display mechanism for projecting prescribed images; an annular mounting device 10 for mounting and supporting this display device 2 on the head; and a visor 80 serving as a light attenuation mechanism movably installed outside the display device 2. By wearing this HMD 1 on his or her head, a user can see the images projected on the display device 2.

The display device 2 comprises a right-side display 2R for the right eye, and a left-side display 2L for the left eye. Stereoscopic images can be reproduced by displaying different images on the right-side display 2R and left-side display 2L.

The visor 80 is shaped as a curved plate and is rotatably attached to the side portion of the frame 10 along the axes defined by fulcrums 80L and 80R. In addition, this visor 80 is composed of a semitransparent resin, and the transmissivity thereof is set to about 10%. When, for example, the user wants to concentrate on the images projected on the display device 2 or the like, the quantity of outside light entering the display device 2 can be reduced by turning the visor 80 downward about the fulcrums 80L and 80R. By contrast, when the user wants to be more aware of the external environment or the like, the quantity of outside light entering the display device 2 can be increased by turning the visor 80 upward about the fulcrums 80L and 80R.

As shown in FIG. 1 and FIGS. 3 through 9, the display device 2 comprises a right-side display 2R in a position corresponding to the right eye, a left-side display 2L in a position corresponding to the left eye, and a light source component (backlight) 70 placed above the displays 2R and 2L and designed to supply light to the above-mentioned displays 2R and 2L.

Figure 3:
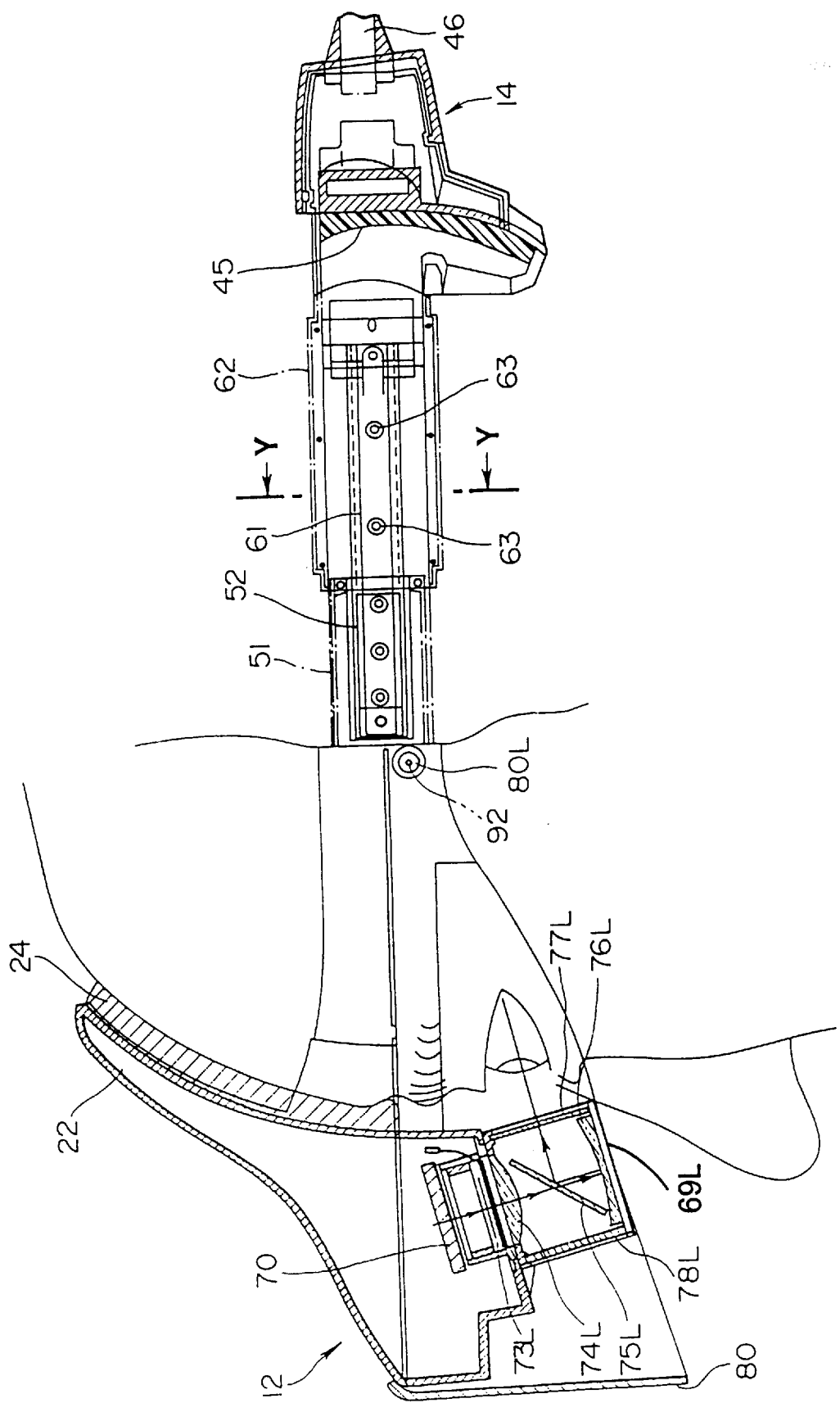
FIG. 3 is an X—X cross section of FIG. 2.
Figure 4:
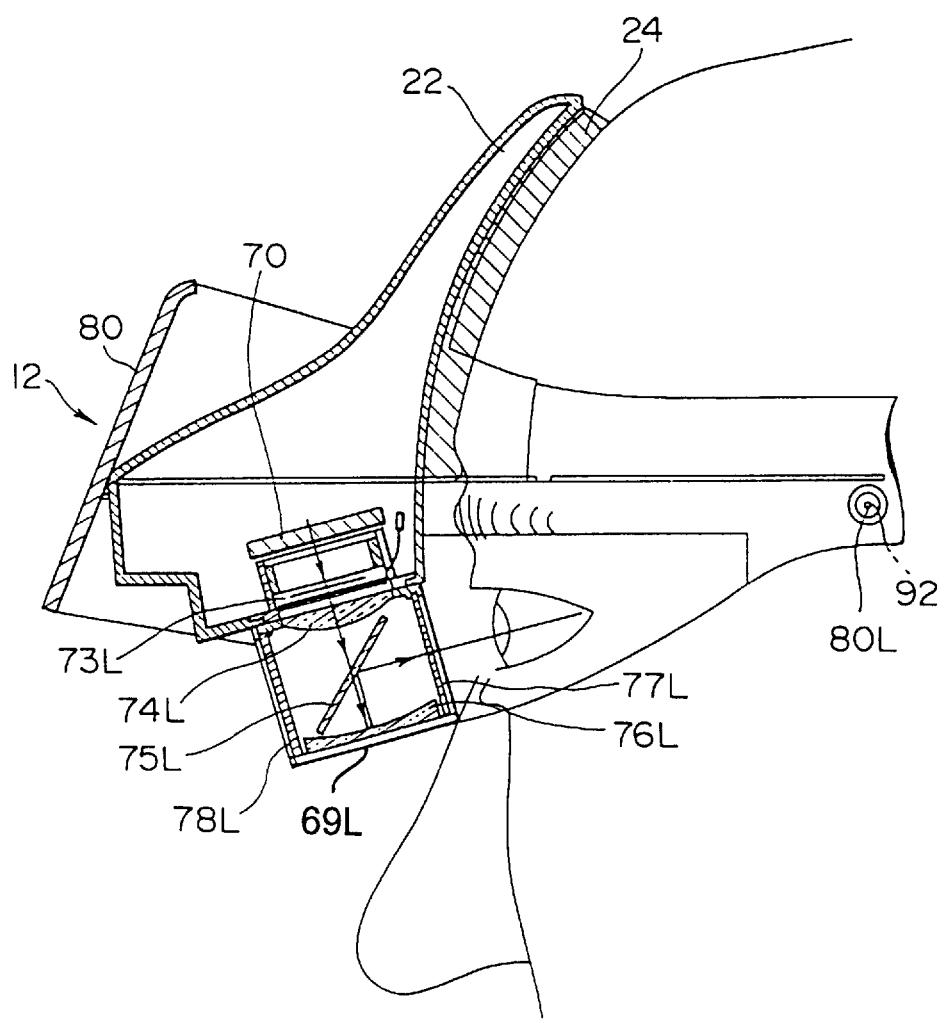
FIG. 4 is an X—X cross section of FIG. 2.
Figure 5:
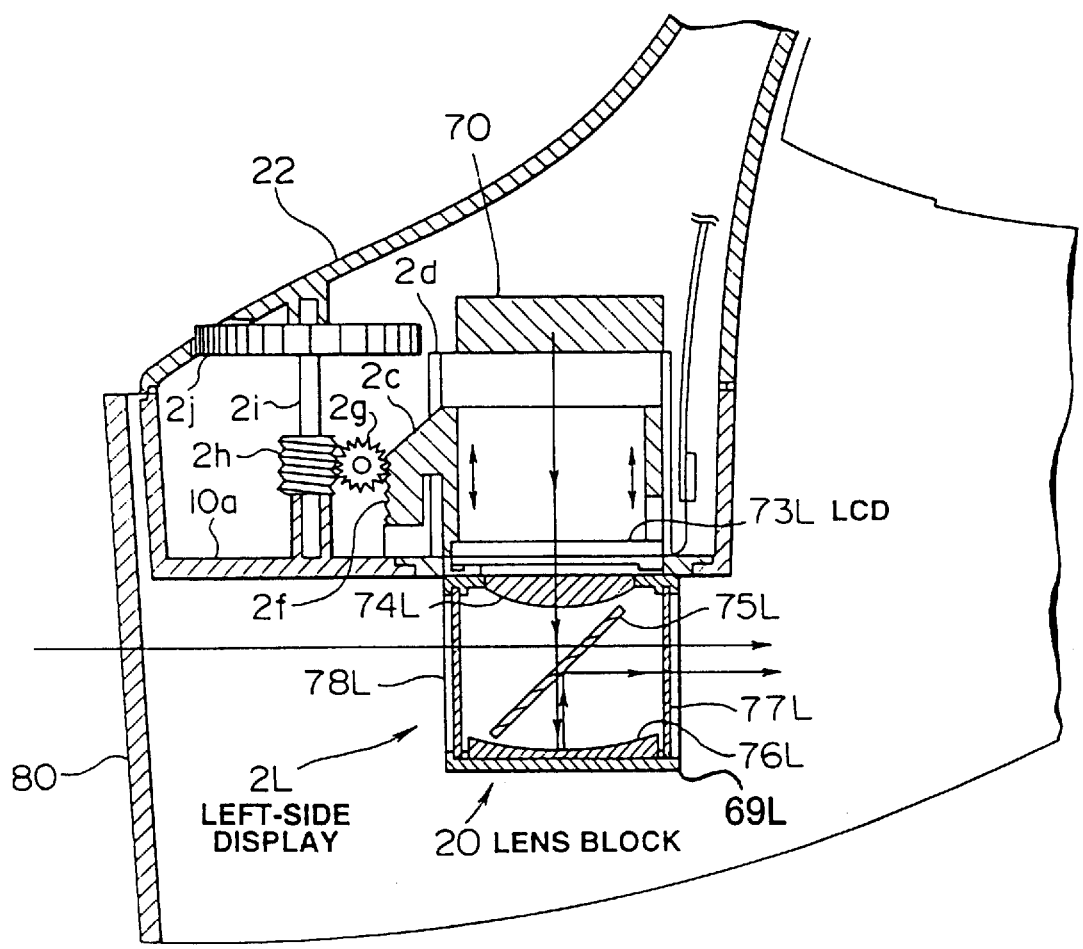
FIG. 5 is a cross section of the HMD pertaining to the first embodiment of the present invention.

The left-side display 2L comprises a clear cover 77L, in which the portion that faces the left eye is transparent, particularly as shown in FIGS. 3 through 5. The surface opposite this clear cover 77L comprises a housing 69L composed of a transparent cover glass 78L. Because the left-side display 2L described here comprises the clear cover 77L and the cover glass 78L, the living environment can be seen through the left-side display 2L, that is, "see-through" conditions are maintained, even when this component is mounted.

An LCD (liquid-crystal display) 73L is positioned above the housing 69L. The housing 69L accommodates a lens 74L positioned close to the LCD 73L and parallel to the display plate of the LCD 73L, a half-mirror 75L positioned below the lens 74L and inclined at an angle of 45 degrees to the lens 74L, and an aspherical concave reflecting mirror 76L positioned below the half-mirror 75L. Such an arrangement of the optical system can prevent the optical axis from shifting and improves assembling accuracy.

As shown by the arrows in FIGS. 3 through 5, light (images) radiated by the LCD 73L of the light source component 70 in the left-side display 2L passes first through the lens 74L and then through the half-mirror 75L, and is reflected by the aspherical concave reflecting mirror. In addition, the reflected light, which is reflected at 90 degrees (in the direction of the right plane) by the half-mirror 75L, passes through the clear cover 77L and reaches the left eye of the player.

Specifically, the following luminous energy from a fluorescent tube 71 will reach the eye when, for example, the luminous energy of the fluorescent tube 71 is 3000 nt, the transmissivity of the LCD 73L 2%, the transmissivity of the lens 74L 92%, the transmissivity of the half-mirror 75L 50%, the reflectivity of the aspherical concave reflecting mirror 76L 85%, and the transmissivity of the clear cover 77L 92%.

(Luminous energy from fluorescent tube 71 reaching the eye)=(Luminous energy of fluorescent tube 71) * (Transmissivity of LCD 73L) * (Transmissivity of lens 74L) * (Transmissivity of half-mirror 75L) * (Reflectivity of aspherical concave reflecting mirror 76L) * (Transmissivity of half-mirror) * (Transmissivity of clear cover 77L)=3000 * 0.02 * 0.92 * 0.5 * 0.85 * 0.5 * 0.92=11 nt.

This left-side display 2L is positioned in such a way that it is inclined downward at an angle of 10 to 20 degrees to the line of sight of the player. This reduces player fatigue caused by viewing. Specifically, when a user wears the HMD, his or her line of sight is inclined downward from the horizontal approximately by an angle θ (10 to 20 degrees). Generally, a person reduces his or her fatigue by tilting his or her line of sight downward by 10 to 20 degrees with respect to the horizontal direction rather than fixing it in the horizontal direction. The HMD pertaining to this embodiment therefore allows the user to reduce fatigue despite wearing the HMD for a long time. In addition, in cases such as those in which the user wears glasses, these glasses are often tilted downward. The present invention prevents the glasses from coming into contact with the display mechanism because the display mechanism of the HMD is tilted downward with respect to the eyes in the same manner. It is therefore possible to bring the display mechanism of the HMD close to the eyes and to increase the angle of view of the eyes with respect to the display mechanism even when glasses are worn.

Figure 6:
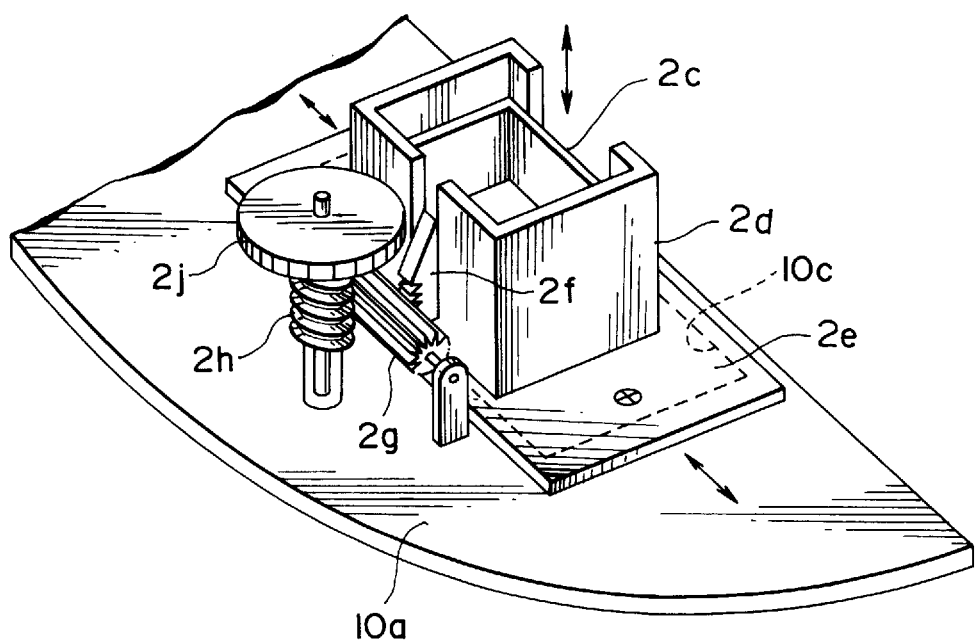
FIG. 6 is a diagram depicting the focus adjustment mechanism of the HMD pertaining to the first embodiment of the present invention.
Figure 9:
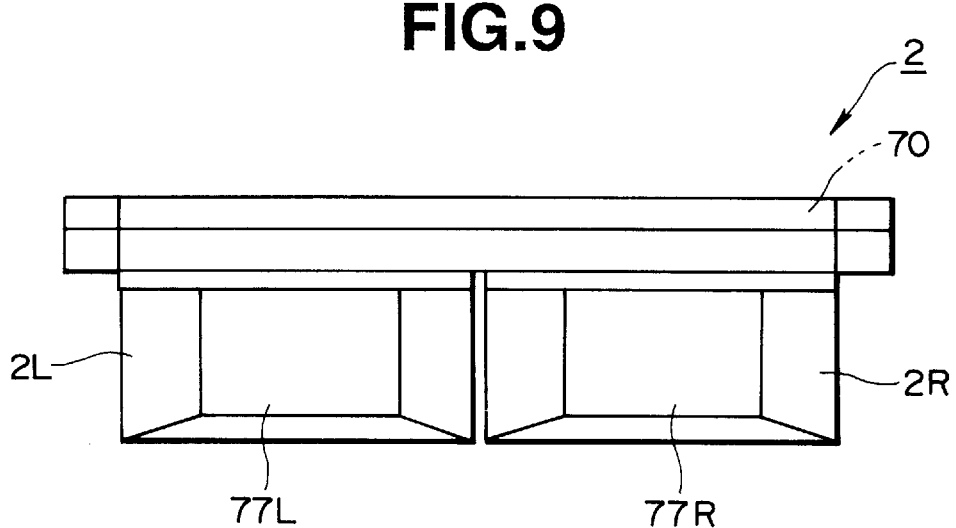
FIG. 9 is a front view of the display device of the HMD shown in FIG. 1.

FIG. 5 is a cross section of the left-side display 2L. In addition, FIG. 6 is a perspective view of the focus adjustment mechanism of the left-side display 2L. In these figures, symbol 70 denotes a light source component. The light source component 70 comprises a fluorescent tube and a light guide plate for directing light generated by the fluorescent tube toward an LCD (liquid-crystal display plate) 73L. The LCD 73L is capable of color display and is connected to an LCD driver (display circuit), which is not shown. This LCD 73L is also capable of transmitting light radiated by the light source component 70.

An LCD holding component 2c is shaped as a rectangular tube, and the LCD 73L is attached to one of the openings thereof. This LCD holding component 2c is housed inside a rectangular tubular housing 2d and can move up and down inside the housing 2d.

The housing 2d is shaped as a rectangular tube, and one opening is provided with a plate component 2e. The plate component 2e of the housing 2d can move while sliding over the base plate 10a of the frame 10. It is therefore possible to move the left and right housings 2d apart from each other or closer to each other in accordance with the interocular distance of the user.

A rectangular window 10c is formed in that position of the horizontal plate 10a where the plate component 2e of the housing 2d is installed. A box-type lens block 20 is inserted into this window 10c and attached to the plate component 2e of the housing 2d. This lens block 20 houses a convex lens 74L, a half-mirror 75L inclined at an angle of 245 degrees to the lens 74L, an aspherical concave mirror 76L positioned below the half-mirror 75L, and transparent clear covers 77L and 78L.

Therefore, light emitted by the light source component 70 passes through the LCD 73L, lens 20b, and half-mirror 75L, and reflects from the aspherical concave mirror 76L and half-mirror 75L. The reflected light reaches the eye of the user after passing through the clear cover 77L. Meanwhile, outside light that has passed through the visor 80 successively passes the clear cover 78L, half-mirror 75L, and clear cover 77L, and reaches the eye of the user. To the eye of the user, the everyday surroundings appear only as a faint outline because the luminous energy of the outside light is reduced following passage through the visor 80, half-mirror 75L, and clear covers 77L and 78L. When the visor 80 is brought up, however, the attenuation of the outside light is reduced, and the everyday surroundings become more visible to the eye of the user.

A discoid knob 2j partially extends from a window formed in the front part of the support member 22 of the frame 10. A shaft 2i is inserted into the center of the knob 2j, and the ends of the shaft 2i are rotatably supported by the base plate 10a and the support member 22. In addition, a worm gear 2h is formed around the shaft 2i, and this worm gear 2h engages a gear 2g positioned horizontally on the base plate 10a. In addition, the gear 2g engages a gear 2f formed in such a way that it projects from the LCD holding component 2c.

Therefore, when the user rotates the knob 2j, the rotational movement is transmitted to the LCD holding component 2c via the worm gear 2h and gears 2g and 2f, and the LCD holding component 2c moves up and down. This allows the distance between the LCD 73L and the lens block 20 to be varied, and the focus to be freely adjusted.

The structure of the right-side display 2R not shown in FIGS. 5 and 6 is symmetrical to the structure of the left-side display 2L, and will therefore be omitted from the description.

In FIGS. 7 and 8, the above-mentioned light source component 70 comprises a fluorescent tube 71 serving as a light source; a light guide plate 72 for transmitting the light radiated by the fluorescent tube 71 to LCDs 73L and 73R; and a housing 79 for accommodating the fluorescent tube 71 and light guide plate 72.

The housing 79 is shaped as a trapezoid in which the side 81 closer to the player is longer than the opposite side (side 82). A support component 68 for supporting and fixing the housing 79 on the front frame 12 described below is provided in the central portion at the side 82. A fluorescent tube positioning component 84 for positioning the fluorescent tube 71 parallel to the side 81 is formed at the side 81 of the housing 79. In addition, a light guide plate positioning component 83 is formed at the side 82 of the housing 79 close to the fluorescent tube positioning component 84. Specifically, the fluorescent tube 71 is positioned inside the housing 79 while facing the longitudinal side surface of the light guide plate 72, and light radiated by the fluorescent tube 71 enters through the side longitudinal surface of the light guide plate 72.

Openings 79L and 79R are formed in sections that correspond to the upper parts of the above-mentioned right and left displays 2L and 2R of the housing 79 (sections opposite the LCDs 73L and 73R). Light from the light source component 70 reaches the left and right displays 2L and 2R through these openings 79L and 79R. A side wall 88 forming an isosceles triangle in which the central part of the side 82 serves as the base is provided between the left and right openings 79L and 79R of the housing 79. The angles a of the two sides of the isosceles triangle are set in such a way that when light radiated by the fluorescent tube 71 reaches the light guide plate 72, light emitted from the side 82 of the light guide plate 72 is reflected by the side wall 88 and refocused on the opening 79L (79R) inside the light guide plate 72. This allows light radiated by the fluorescent tube 71 to reach the LCDs 73L and 73R with satisfactory efficiency. Considering the reflection efficiency of light radiated by the fluorescent tube 71, is preferable for the housing 79 to be of a high-transmissivity color, for example, white.

As shown in FIGS. 1 through 4, the above-mentioned visor 80 is installed on the outside front surface of the display device 2 while being allowed to turn (move) up and down about two upper ends that are located at the sides of the head and that serve as fulcrums 80L and 80R. Specifically, when the quantity of outside light entering the display device 2 is to be reduced (for example, when the object is to concentrate on viewing the images projected on the display device 2), the visor 80 is turned (moved) downward about the fulcrums 80L and 80R, and the outside front surface of the display device 2 is covered, as shown in FIG. 3, and when the quantity of outside light entering the display device 2 is to be increased (for example, when the object is to become more aware of the external environment), the visor 80 is turned (moved) upward about the fulcrums 80L and 80R, and the outside front surface of the display device 2 is opened, as shown in FIG. 4. When opened, this visor 80 comes into contact with the outside upper part of the display device 2, as shown in FIG. 4, and is held in place by the frictional force exerted under these conditions. The visor 80 can be closed again by being lightly turned (moved) downward from this position.

Here, when the visor 80 is in a blocked state, the outside light reaches the eye via the clear cover 78L (78R), half-mirror 75L (75R), and clear cover 77L (77R) after passing through the visor 80. On the other hand, when the visor 80 is opened, the outside light reaches the eye via the clear cover 78L (78R), half-mirror 75L (75R), and clear cover 77L (77R).

Figure 13:
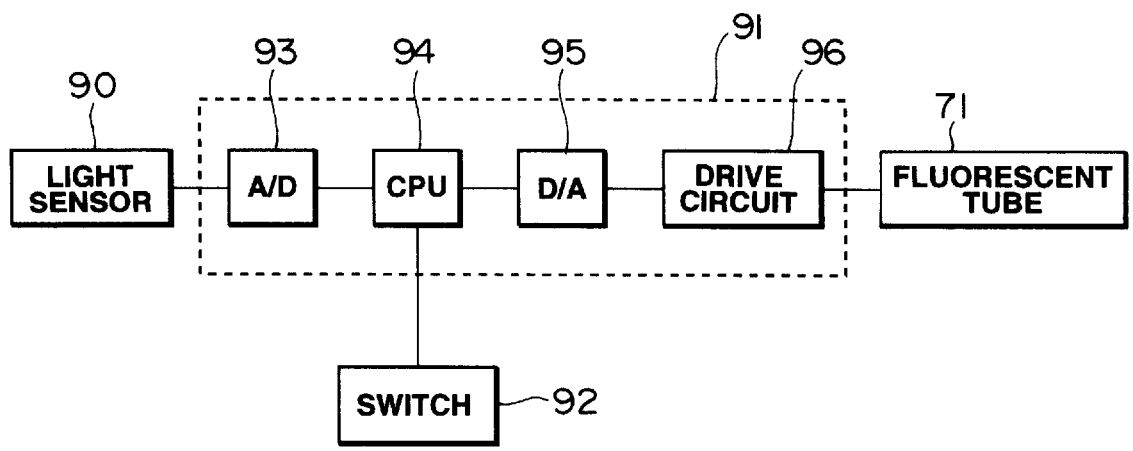
FIG. 13 is a circuit block diagram of the light source component pertaining to an embodiment of the present invention.

A switch 92 serving as a movement detection means for sensing the blocked and open states (that is, movement states) of the visor 80 is connected to the above-mentioned fulcrum 80L. This switch 92, which is connected to the fluorescent tube 71 via a luminous energy control device 91 described in detail below, sends lighting signals to the fluorescent tube 71, as shown in FIG. 13. Specifically, the switch 92 is configured in such a way that when the visor 80 is in a blocked state, an "on" signal that lights the fluorescent tube 71 is outputted to the CPU 94, and when the visor 80 in opened, an "off" signal that extinguishes the fluorescent tube 71 is outputted to the CPU 94. This increases the quantity of outside light entering the display device 2 and prevents images from being projected on the display device 2 when the visor 80 is opened. The external environment can therefore be perceived (seen) more clearly through the display device 2, that is, while the HMD 1 is still worn.

The luminous energy control device 91 is connected to the above-mentioned fluorescent tube 71, as shown in FIG. 13. This luminous energy control device 91, which is installed in the outer central part of the front frame 12, controls the luminous energy irradiated by the fluorescent tube 71 in accordance with the quantity of outside light detected by a light sensor 90 for detecting the quantity of outside light reaching the eye. Specifically, the light sensor 90 outputs the quantity of outside light thus detected to the A/D converter 93 of the luminous energy control device 91, the above-mentioned quantity of outside light is converted from analog to digital form by the A/D converter 93, and the result is outputted to the CPU 94. The relation between the quantity of outside light and the luminous energy of the fluorescent tube 71 is preset for the CPU 94, and the data obtained based on this relation is outputted via an D/A converter 95 to a drive circuit 96 for driving the fluorescent tube 71. The drive circuit 96 determines the electric energy to be supplied to the fluorescent tube 71 in accordance with the data obtained from the A/D converter 95 [*4], and the fluorescent tube 71 irradiates luminous energy that corresponds to this electric power.

In the present embodiment, when the visor 80 has been placed in a blocked state, the quantity of outside light that passes through the visor 80 and reaches the eye when the visor 80 is in a blocked state is smaller than the luminous energy reaching the eye from the fluorescent tube 71 via the LCD 73L (73R), lens 74L (74R), half-mirror 75L (75R), aspherical concave reflecting mirror 76L (76R), and half-mirror 75L (75R). This allows the images projected on the display device 2 to be vivid and the user to concentrate on viewing these images when the visor 80 has been placed in the blocked state.

On the other hand, when the visor 80 is opened, the quantity of outside light directly reaching the eye is lower than the luminous energy reaching the eye from the fluorescent tube 71 through the LCD 73L (73R), lens 74L (74R), half-mirror 75L (75R), aspherical concave reflecting mirror 76L (76R), and half-mirror 75L (75R). This allows the player to see the living environment clearly when the visor 80 is opened.

To satisfy such a relation, the luminous energy of the fluorescent tube 71 is automatically adjusted in accordance with the quantity of outside light. The player can therefore constantly view vivid images and adequately survey the living environment as needed, irrespective of the brightness of the site where the HMD 1 is used.

The above-mentioned mounting device 10 comprises a front frame 12, a back frame 14, and connecting devices 30A and 30B. The front frame 12 can surround the front part of the head and cover both eyes when mounted on the head. The front frame 12 has a hollow, roughly semi-annular configuration having an internal R-shape that corresponds to the shape of the front part of the head. The back frame 14 can surround the back of the head and has a hollow, roughly semi-annular configuration having an internal R-shape that corresponds to the shape of the back of the head. The connecting devices 30A and 30B, which are positioned at the two ends between the above-mentioned front frame 12 and back frame 14, connect the front frame 12 and the back frame 14 while allowing movement in the longitudinal direction of the head.

When mounted on the head, the above-mentioned front frame 12 is provided with the above-mentioned display device 2, which is installed in a position facing both eyes. In addition, the front frame 12 is provided, at a point shifted forward from the position that faces both ears, with a headphone terminal 4 for outputting prescribed sounds and with a volume adjustment component 5 for adjusting the volume of the sound outputted by the headphone.

Figure 2:
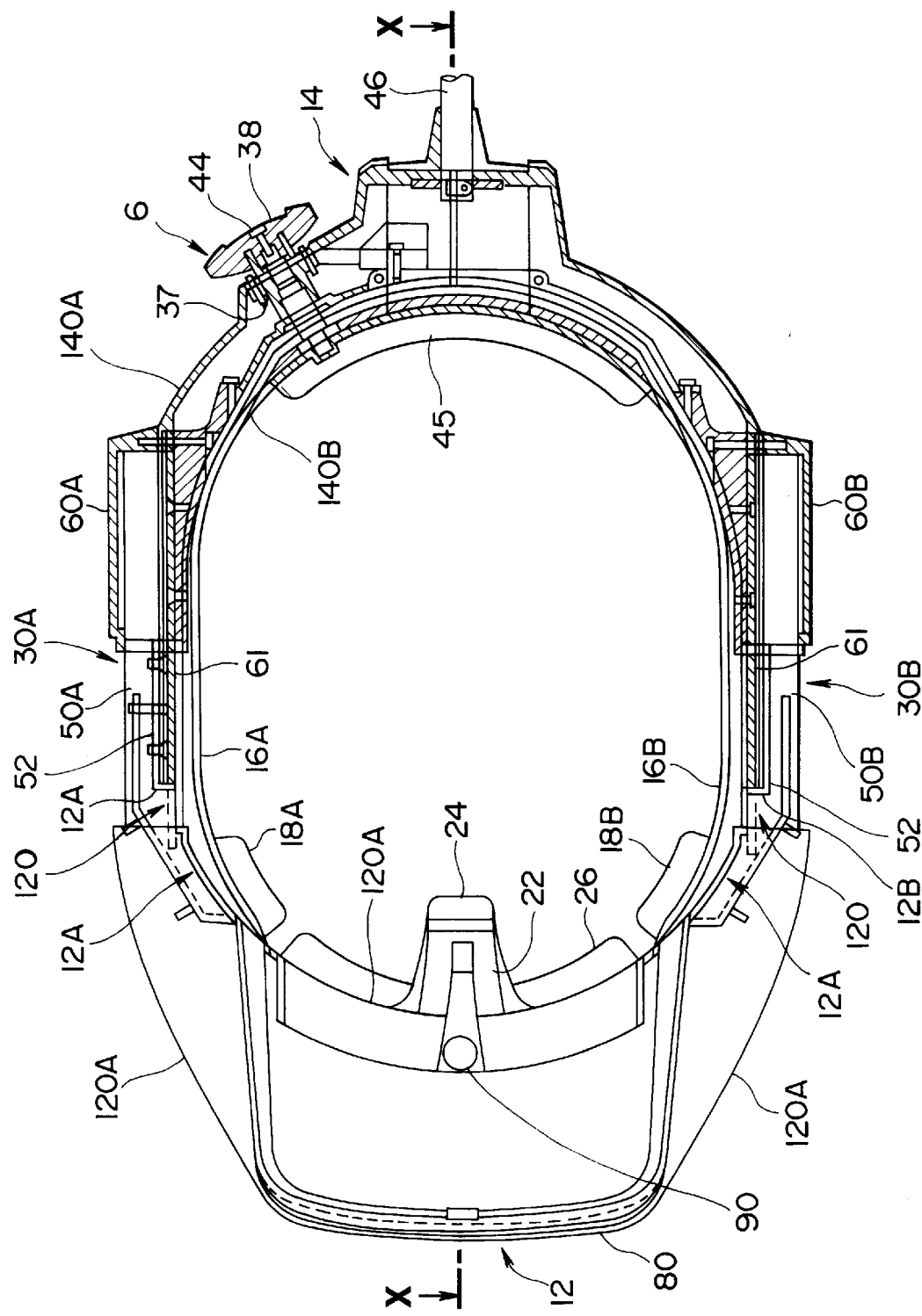
FIG. 2 is a plan view of FIG. 1.

As shown in particular in FIG. 2, the ends of a pair of belts 16A and 16B extending around the temporal regions are fixed at positions corresponding to the temples on the inside of the front frame 12. Pads 18A and 18B are formed on the attachment ends of these belts 16A and 16B in such a way that these pads project inward and come into contact with both temples when the HMD 1 is mounted on the head. In addition, the center of the front frame 12 is provided with a support member 22 that has an R-shape and extends from the front part of the head toward the top of the head, nearly reaching it. The tip of this support member 22 that is closer to the top of the head is provided with a pad 24 capable of coming into contact with the top of the head. In addition, the portions of the front frame 12 that face the front part of the head (and the forehead in particular) are provided with pads 26 capable of coming into contact with the front part of the head.

Although this is not illustrated in any particular manner, this front frame 12 can be attached to and detached from the main body portion constituting the interior of an outside casing 120A, that is, the main body portion 120B of the front frame 12 equipped with the display device 2, belts 16A and 16B, and the like. In the present embodiment, the outside casing 120A is detachably fixed to the main body 120B of the front frame 12 with the aid of screws or the like. The detachable engagement can also be achieved with the aid of engagement means that can engage the two component without the use of screws or the like.

Providing a structure in which the outside casing 120A can be attached to and detached from the main body 120B of the front frame 12 allows the outside casing 120A to be readily replaced as needed. For example, this can readily accommodate model changes.

Figure 11:
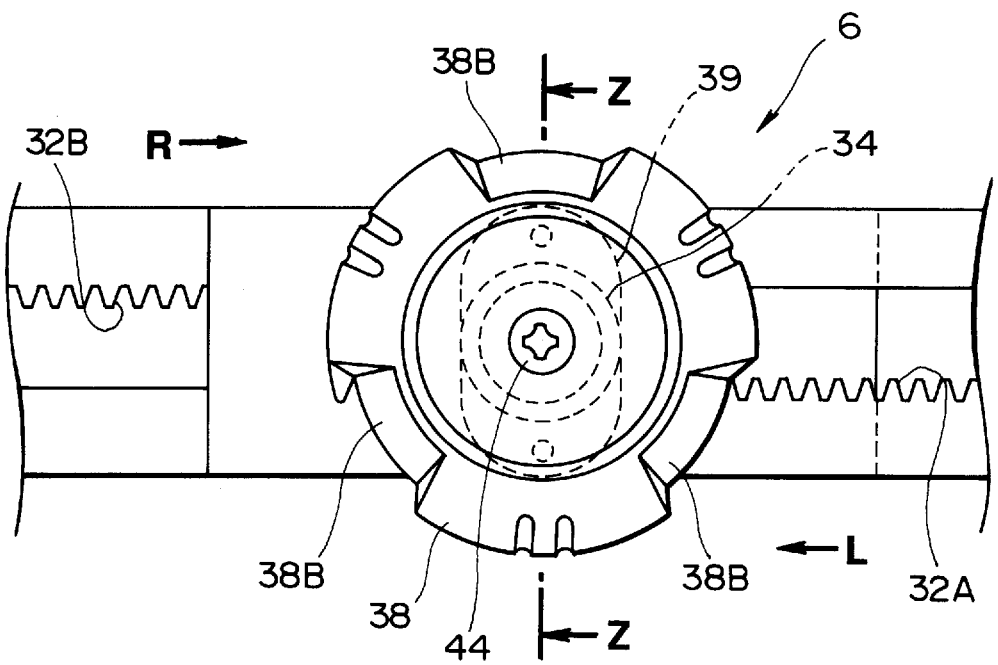
FIG. 11 is a plan view showing a portion of the back section of the HMD shown in FIG. 1.

Racks 32A and 32B are formed in the vicinity of the free ends of the above-mentioned belts 16A and 16B, which are the ends opposite to the above-mentioned attachment ends, as shown in FIG. 11. These racks 32A and 32B are introduced all the way into the belt fastening device 6 described in detail below, so that constant engagement is achieved with the pinion 34 of the above-mentioned belt fastening device 6. Specifically, the pinion 34 and the racks 32A and 32B remain in engagement even when the belt fastening device 6 has been operated over the maximum distance in the direction of release of the fastened belt, and the front frame 12 and back frame 14 have been moved to the maximum toward the front and back of the head.

Figure 12:
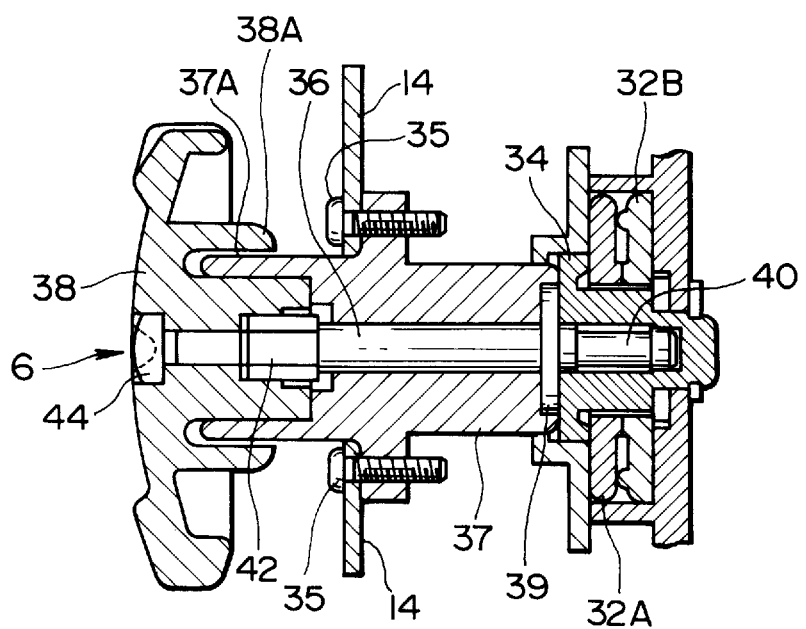
FIG. 12 shows a cross-sectional view of the belt tightening device illustrated in FIG. 11.

The above-mentioned belt fastening device 6 will now be described in detail. As shown in FIG. 2, the back frame 14 is fitted with the belt fastening device 6, which is installed in a position corresponding to the right posterior part of the head, that is, in a position shifted (offset) to the right from the central part of the back frame 14. Thus, installing the belt fastening device 6 in a position shifted to the right from the central part of the back frame 14 allows the player to easily operate the belt fastening device 6 without being impeded by a cord 46. In addition, as will be described below, the cord 46 can extend from the central part of the back frame 14. As shown in FIGS. 11 and 12, this belt fastening device 6 comprises a shaft 36 for imparting a rotational force to the pinion 34, and a handle 38 for rotating the shaft 36.

The shaft 36, which is installed inside a housing 37 fixed to the back frame 14 with the aid of screws 35, can project toward the tip side that is closer to the front frame 12. The tip of the shaft 36 that is closer to the front frame 12 is provided with a fitting component 40 having a regular hexagonal cross section, and this fitting component 40 is detachably fitted into a regular hexagonal hole formed in the center of the pinion 34 (the structure will be described in detail below). Specifically, shaft rotation is transmitted to the pinion 34 via the fitting component 40. In addition, the shaft 36 is provided with a flange 39 which comes into contact with the end face of the pinion 34 that is closer to the handle 38 when the fitting component 40 has been fitted into the hole formed in the central part of the pinion 34. The handle 38 is provided with indents 38B designed to facilitate finger contact and rotation during the rotation of the handle 38.

At its other end, the shaft 36 is fixed to the handle 38, which serves as a rotational member for rotating the shaft 36, with the aid a hexagonal nut 42 and a bolt 44 (integrally formed with the shaft 36). The end of the above-mentioned housing 37 on the side of the handle 38 is shaped as a hollow projecting flange 37A that projects at a right angle from the back frame 14 toward the handle 38. This projecting flange 37A is fitted into a circular groove formed in the thickness direction of the handle 38. Mutually engaging gears are formed on the inner wall 38A of the handle 38 on the side of the projecting flange, and on the inner wall of the projecting flange 37A on the side of the handle 38. When rotated, the handle 38 retracts in the direction of separation from the pinion 34. During this time, the thread of the projecting flange 37A and the thread of the inner wall 38A remain engaged. The handle 38 rotates the shaft 36, and this rotation is transmitted to the pinion 34.

On the other hand, when the handle 38 is idle, the handle 38 and the projecting flange 37A of the housing 37 are in mutual engagement, and the handle 38 is locked. The above-mentioned pinion 34 is therefore in engagement with the racks 32A and 32B formed at the tips of the belts 16A and 16B. When the handle 38 shown in FIG. 11 is rotated in the clockwise direction, the rack 32B moves in the direction of arrow R and the rack 32A moves in the direction of arrow L at the same time, tightening the belts 16A and 16B on the head. When this handle 38 is rotated in the counterclockwise direction, the racks 32A and 32B move in directions opposite to those described above, and the belts 16A and 16B are loosened from the head.

Figure 1:
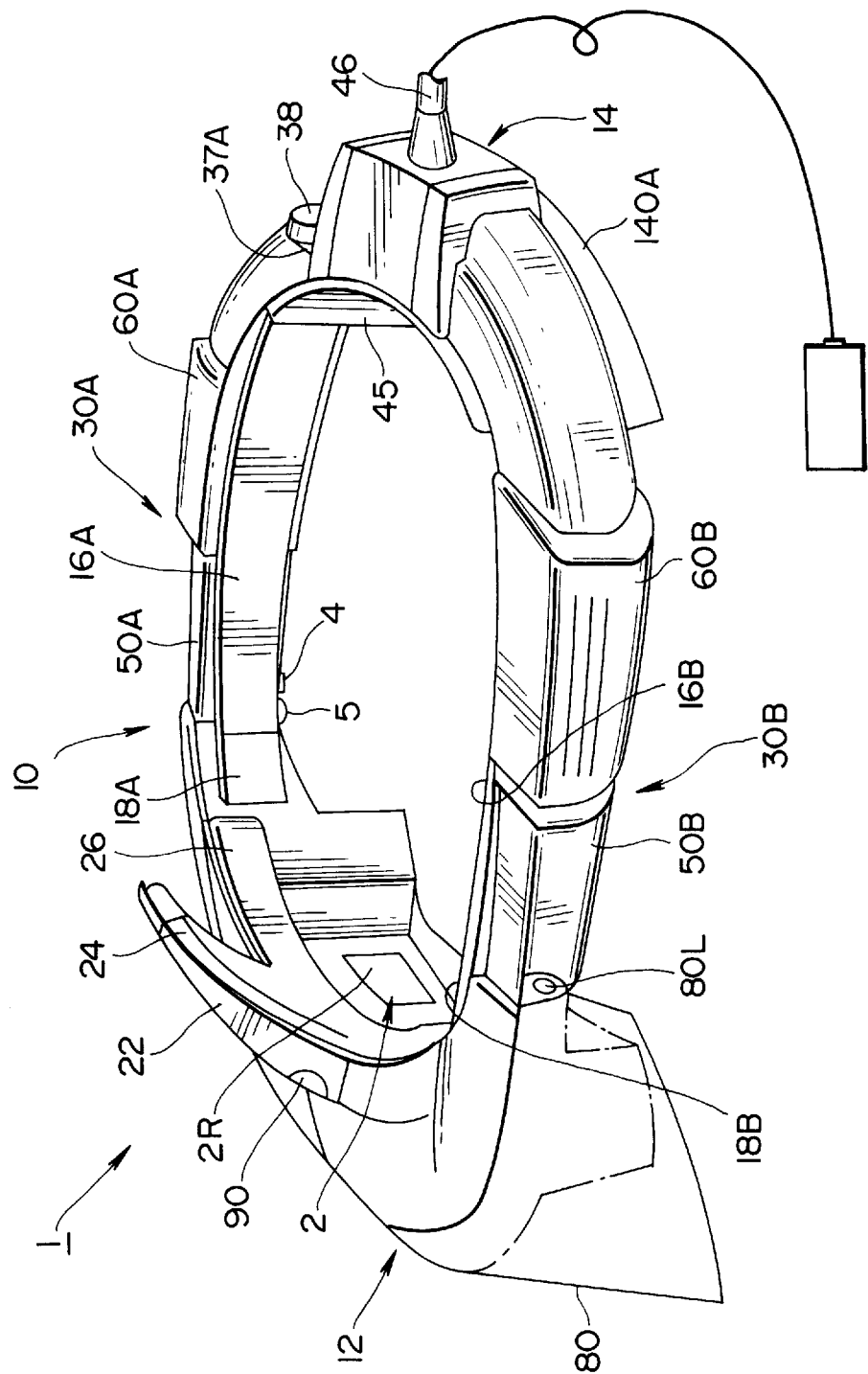
FIG. 1 is a perspective view of the HMD pertaining to a first embodiment of the present invention.

The portion of the above-mentioned back frame 14 that corresponds to the back of the head is provided with a pad 45 capable of pressing against the back of the head (see FIG. 1). In addition, a cord 46 connected to the display device 2 projects from a portion roughly corresponding to the center of the back frame 14. When the HMD 1 is mounted on the head, this cord 46 is connected to a connector component above the head (for example, to a connector component of a control device for controlling the images projected on the display device 2) or the like. The end of the cord 46 that is farther from the back frame 14 is therefore always positioned above the head, thus preventing the cord 46 from becoming an impediment to the player. In addition, the weight of the cord 46 is supported by the above-mentioned connector component, making it possible to reduce the load applied to the frame by most of the weight of the cord 46.

It is also possible to connect the tip of the above-mentioned cord 46 that is farther from the back frame 14 to a cord adjustment device for winding or unwinding the cord 46 in accordance with the tensile strength exerted on the cord 46. When a player wearing the HMD 1 moves away from a game device or other apparatus to which the tip portion of the cord 46 is connected, and a tensile force (tension) is exerted on the cord 46, the cord 46 is paid out from the cord adjustment device in accordance with this tensile force. On the other hand, when the player moves closer to the game device, the slackened cord 46 is taken up by the cord adjustment device.

Thus, installing a cord adjustment device allows the length of the cord 46 extending from the back frame 14 to be adjusted in accordance with the player movements, to further prevent the cord 46 from becoming an impediment to the player, and to prevent the cord 46 from becoming entangled.

The back frame 14 is similar to the front frame 12 in that an outside casing 140A can be attached to and detached from the main body 140B that constitutes the interior, and is detachably fixed with screws or the like in the same manner as in the front frame 12. In addition, the side surface is configured in the same manner to allow the outside casing to be attached and detached.

The above-mentioned connecting device 30, as shown in FIG. 1, comprises first engagement members 50A and 50B fastened to the two ends of the front frame 12, and second engagement members 60A and 60B fastened to the two ends of the back frame 14.

Figure 10:
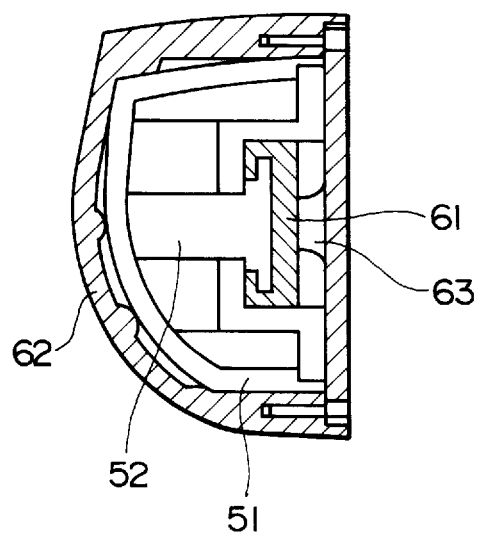
FIG. 10 is an Y—Y cross section of FIG. 3.

The first engagement members 50A and 50B comprise, as shown in FIGS. 1 through 3 and in FIG. 10, a hollow housing 51 having an internal R-shape that corresponds to the sides of the head, a rail 61 for the second engagement members 60A and 60B that is fixed to the inside of the housing 51 and that will be described in detail below, and a slider 52 that is retracted and extended along the rail 61 in accordance with the operation of the above-mentioned handle 38.

The second engagement members 60A and 60B comprise a hollow-shape housing 62 and a rail 61 fixed to the inside of the housing 62 with a screw 63. The housing 62 has an internal R-shape that corresponds to the sides of the head, and dimensions that allow the housing 51 to be movably inserted inside. The side of the rail 61 that is closer to the front frame 12 is positioned in such a way that it extends into the housing 51. The structure allows the above-mentioned housing 51 to be retracted into or extended from the housing 62 by moving the constant-width slider 52 along the rail 61, and this advancing and retracting movement can vary the longitudinal length of the connecting device 30 itself.

The U-shaped end 12B of the inner wall 12A (see FIG. 2) of the above-mentioned front frame 12 is equipped with a slot (not shown) one size larger than the end of the above-mentioned rail 61. When the above-mentioned belts 16A and 16B are tightened and the front and back frames brought closer together, the rail 61 advances through this slot into the space 12C of the front frame 12 while undergoing elastic deformation (see the chain line in the figure). This allows the slider 52 to move toward the back frame 14 along the rail 61, and the HMD 1 to be mounted on the head.

A specific operation of the HMD pertaining to the present embodiment will now be described. In this embodiment, a case will be described in which the HMD is connected to a gaming apparatus and a prescribed game is played, as shown in FIG. 14.

Figure 14:
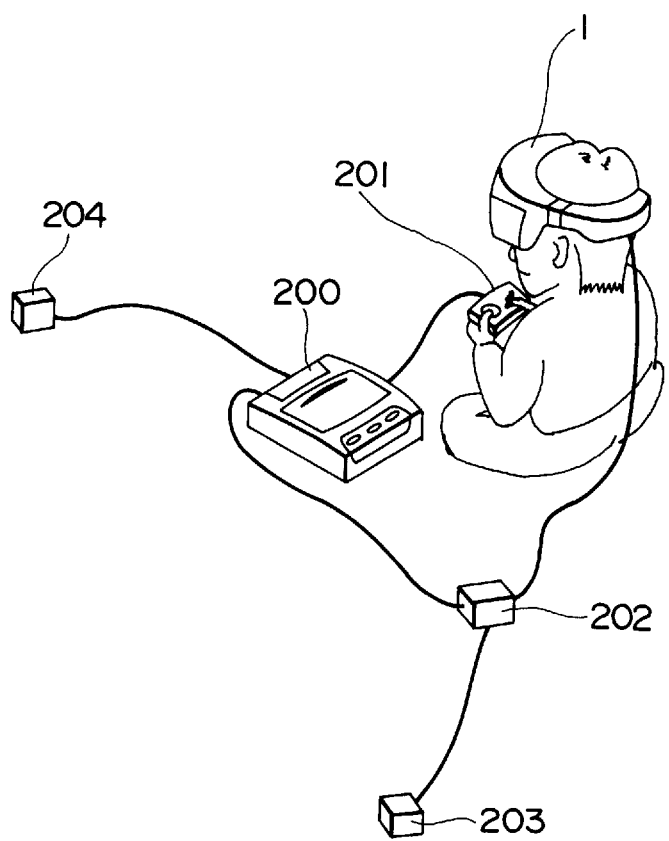
FIG. 14 is a diagram illustrating the method for using the HMD pertaining to an embodiment of the present invention.

FIG. 14 is a conceptual diagram showing a state in which the HMD 1 is connected to a gaming apparatus 200. In the figure, symbol 201 denotes a conventional control pad, symbol 202 a control box into which the above-mentioned luminous energy control device 91 has been incorporated, symbol 203 an AC adaptor connected to the control box 202, and symbol 204 an AC adaptor connected to the gaming apparatus 200.

When the HMD 1 is to be mounted on the head, the dial 38 of the belt fastening device 6 is first rotated in a prescribed direction, and the belts 16A and 16B are extended to a suitable length to increase the length of the connecting device 30 and to increase the diameter of the mounting device 10 to a size comfortable for mounting. The HMD 1 is subsequently placed in a position of head mounting, the pads 18A and 18B are pressed against the temples, the pad 26 is pressed against the forehead, and the pad 24 is pressed against the top of the head. The dial 38 is then depressed to ensure a fit between the fitting component 40 and the hole bored in the central portion of the pinion 34.

The dial 38 is subsequently rotated in the direction opposite to the one mentioned above, whereby the rack 32A is moved in the direction of arrow L in FIG. 11, the rack 32B is moved in the direction of arrow R in FIG. 11, and the tightening the belts 16A and 16B along the sides of the head is started. At the same time, the engagement component 52 moves back along the rail 61, and the housing 51 is inserted into the housing 62, reducing the length of the connecting device 30 itself. The distance between the front frame 12 and the back frame 14 is reduced, and the pad 45 is pressed against the back of the head. A further rotation of the dial 38 tightens the front frame 12 against the front part of the head, and the back frame 14 against the back of the head. In addition, the belts 16A and 16B are tightened against the sides of the head.

The HMD 1 therefore does not slide off the head even during violent head movements. In addition, an excellent sense of fit is obtained because the pads 18A and 18B are pressed against the temples, the pad 26 is pressed against the forehead, the pad 45 is pressed against the back of the head, and the pad 24 is pressed against the top of the head.

It is subsequently confirmed that the HMD 1 does not shift even during violent head movements, and the rotation of the dial 38 is stopped. In this case, the mounting of the HMD 1 is further facilitated because the belt fastening device 6 is provided at a location where it can be easily operated by the player (to the left from the center of the back frame 14).

Headphones are subsequently connected to the headphone terminal 4, and power is supplied to the gaming apparatus 200, control box 202, and HMD 1. At this time, the visor 80 is closed. The game subsequently starts when the start button on the control pad 201 is depressed, and the desired images are projected on the display device 2. The volume is adjusted as needed with the volume adjustment component 5. At this time, the visor 80 is closed, the quantity of outside light (brightness of the game site) is detected by the light sensor 90, and the luminous energy radiated by the fluorescent tube 71 is controlled by the luminous energy control device 91 in accordance with these data so as to obtain an optimum amount. The player therefore can view vivid images and to concentrate on the game (viewing). In these conditions, the visor 80 and the display device 2 remain transparent to some extent even in the course of the game (viewing), so the external environment can also be perceived. Games can therefore be played with higher safety.

If a better perception of the external environment is to be achieved in the course of a game, the visor 80 is opened by being turned upward about the fulcrums 80L and 80R. This increases the quantity of outside light that enters the display device 2 from the outside, opens the switch 92 of the fluorescent tube 71, and stops the images from being projected on the display device 2. The external environment can therefore be clearly perceived even when the HMD 1 is still worn. It is also possible at this time to depress the pause switch on the control pad 201 and to temporarily stop the game.

To resume the game, the visor 80 should be turned downward about the fulcrums 80L and 80R, the switch 92 of the fluorescent tube 71 closed, and the fluorescent tube 71 lighted. If the game is temporarily stopped, the pause button on the control pad 201 should be depressed again to cancel the pause mode.

To remove the HMD 1 from the head, the dial 38 should be rotated in the opposite direction, the racks 32A and 32B moved in the direction opposite to that mentioned above, the belts 16A and 16B loosened, the length of the connecting device 30 increased, and the diameter of the mounting device 10 increased as well.

In the present embodiment, the light attenuation mechanism was described with reference to the use of a visor 80, but the light attenuation mechanism is not limited to such use and may involve the use of glasses such as sunglasses or have any other structure.

In addition, the present embodiment described the use of a transparent visor 80, but the visor 80 is not limited to this case alone and can be nontransparent as long as it can move between a position in which it covers the outside front surface of the display device 2 and a position in which it opens the outside front surface of the above-mentioned display device 2. In such a case, when the visor is in the position in which it covers the outside front surface of the display device 2, no light penetrates from the outside into the display device, making it possible to further concentrate on viewing, and when the visor is opened, the living space can be perceived without the need to remove the HMD from the head.

Specifically, the transmissivity of this visor 80 may be a comparatively low value (value which impedes the passage of outside light) or a value at which the outside light is blocked completely. It is preferable for the transmissivity of this light attenuation mechanism to be such that, for example, the outlines of appliances, furniture, and other objects occupying a living space remain discernible when images are displayed by the image display mechanism. Such a transmissivity at the same time allows images from the image display mechanism to be vividly reproduced. The following brightness levels can be suggested for the external environments in which HMDs can be used: an area near a window in a sunlit room on a clear day (for example, 6500 to 4500 nt); a central area in a room illuminated with a fluorescent lamp, at a position where television or the like is viewed (for example, 3000 to 1500 nt); a dark room at a distance from illuminated areas (for example 1500 to 700 nt); and the like. It is obvious that the transmissivity of the visor 80 is at a level which allows the outlines of appliances, furniture, and other objects occupying a living space to remain discernible within these ranges of brightness when images are displayed by the image display mechanism, but the presence of the light sensor 90 and the luminous energy control device 91 makes it possible to view vivid images at other brightness levels as well.

In addition, the present embodiment involves controlling the quality of the images projected on the display device 2 by opening and closing the visor 80 and adjusting the luminous energy of the fluorescent tube 71. This is not the only option, however. An alternative may be to provide the outside front surface of the display device 2 with a liquid-crystal shutter 301, to connect a luminous energy control device 391 for controlling the transmissivity of the liquid-crystal shutter 301 in accordance with the quantity of outside light detected by the light sensor 90, as shown FIG. 15, and to use this for controlling the above-mentioned picture quality.

Figure 15:
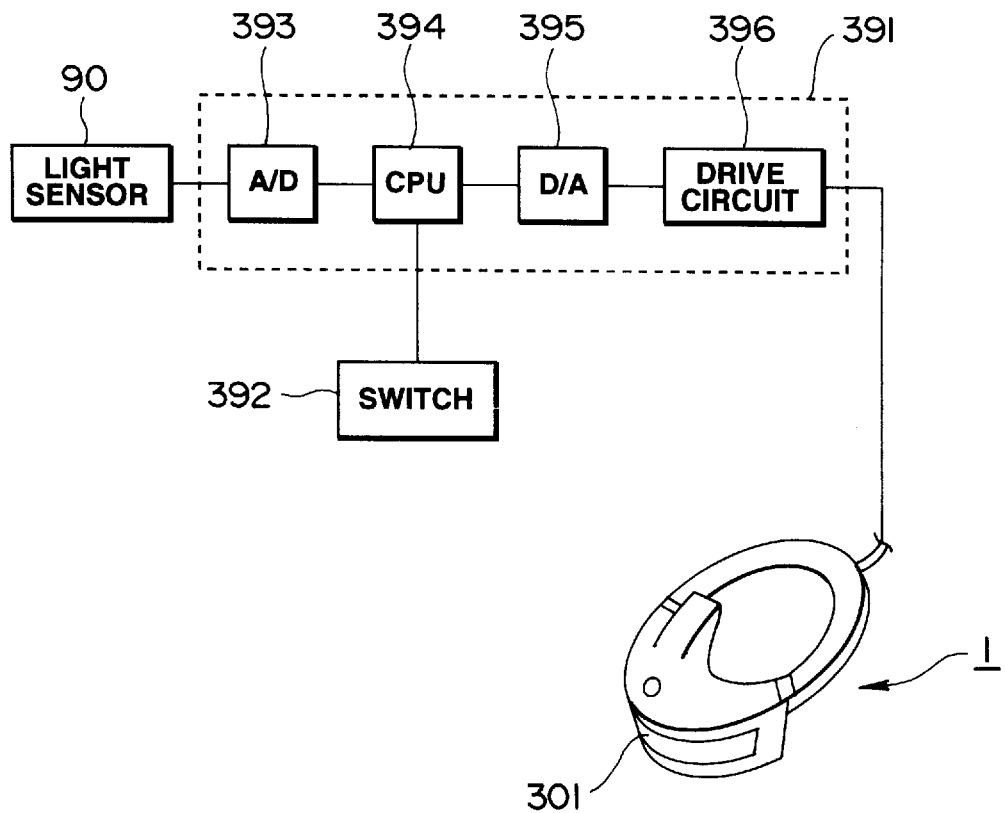
FIG. 15 is another circuit block diagram of the light source component pertaining to an embodiment of the present invention.

Specifically, the light sensor 90 outputs the quantity of outside light detected in this case to a CPU 394 via an A/D converter 393, as shown in FIG. 15. The relation between the quantity of outside light and the transmissivity of the liquid-crystal shutter 301 is preset for the CPU 394, and the data obtained based on this relation are outputted via an D/A converter 395 to a drive circuit 396 for adjusting the transmissivity of the liquid-crystal shutter 301 to a prescribed level. This also allows the quality of the images projected by the display device 2 to be controlled irrespective of the quantity of outside light by controlling the transmissivity of the liquid-crystal shutter 301.

In addition, the light sensor 90 or luminous energy control device 91 does not necessarily need to be installed as long as the transmissivity, reflectivity, or other characteristics of the visor 80 or other components of the optical system are set to prescribed levels.

Figure 16:
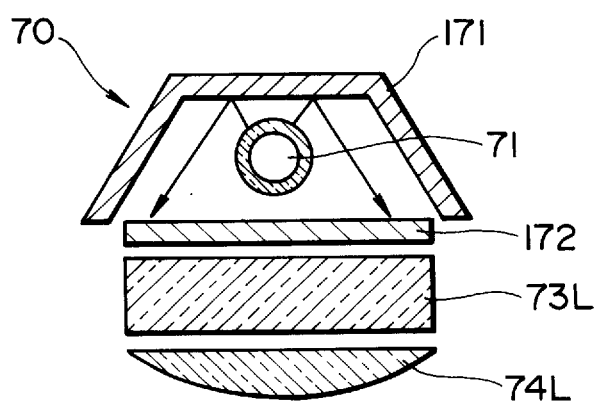
FIG. 16 is a cross section of the light source component pertaining to an embodiment of the present invention.
Figure 17:
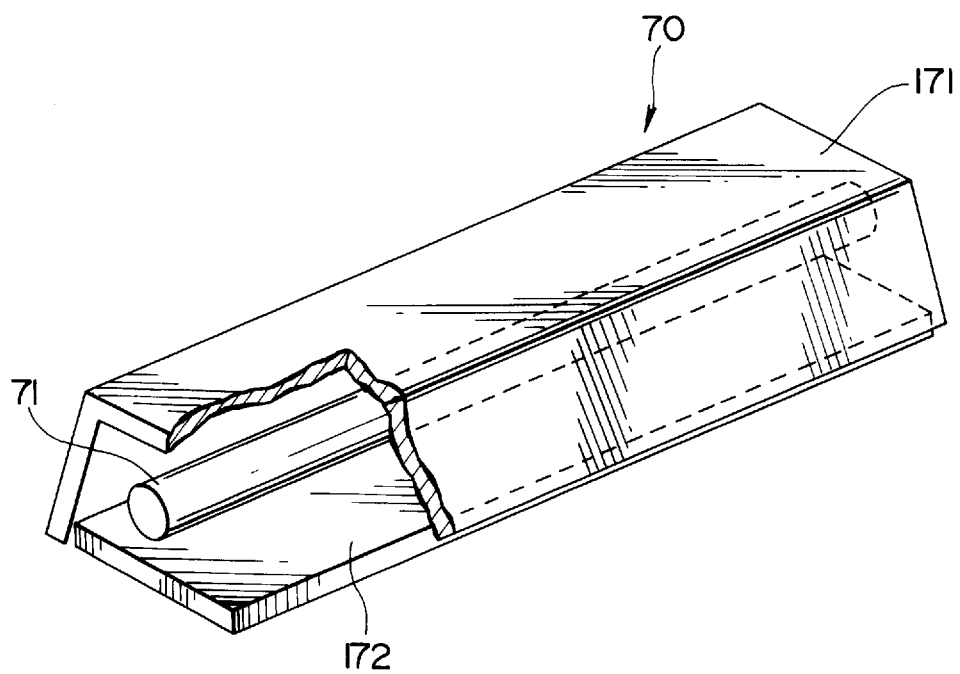
FIG. 17 is a cutaway perspective view of the light source component pertaining to an embodiment of the present invention.

In addition, the present embodiment was described with reference to the use of a light source component 70 with the above-mentioned structure, but this structure is not the only option and may comprise, for example, a diffusion plate 172 which is installed beneath the fluorescent tube 71 and which diffuses the light radiated by the fluorescent tube 71 and transmits this light to a LCDs 73L and 73R, as shown in FIGS. 16 and 17; and a reflection plate 171 which is installed above the fluorescent tube 71 and which reflects the light radiated by the fluorescent tube 71 toward the diffusion plate 172, as shown in FIG. 16.

Specifically, as shown in FIGS. 16 and 17, it is also possible to adopt a structure in which a diffusion plate 172 is placed horizontally above the LCDs 73L and 73R described in the present embodiment, a fluorescent tube 71 is placed parallel to the longitudinal direction of the diffu-sion plate 172, and a reflection plate 171, which is lined on the inside with a reflecting material, which has a cross section resembling a U-shape, and which opens onto the diffusion plate 172, is placed about the fluorescent tube 71 (on the opposite side of the diffusion plate 172). Such a structure allows light radiated by the fluorescent tube 71 toward the reflection plate 171 to be completely reflected there toward the diffusion plate 172. It is therefore possible to focus the light radiated by the fluorescent tube 71 on the diffusion plate 172 with satisfactory efficiency. Because the diffusion plate 172 transmits light to the LCDs 73L and 73R uniformly, the entire areas of the LCDs 73L and 73R can be made uniformly bright.

It is apparent that the above-mentioned reflection plate 171 should have a shape that allows light radiated by the fluorescent tube 71 to be reflected with satisfactory efficiency toward the diffusion plate 172.

In addition, it was mentioned with reference to the present embodiment that opening and closing the visor 80 switches the fluorescent tube 71 on and off and further improves the perception of the external environment and the image quality, but this embodiment is not limited to this arrangement and does not necessarily require the installation of the switch 92. The same effect as that obtained when the visor is opened in a manner such as that described in the present embodiment can be achieved instead by opening a switch 392 and lowering the transmissivity of the liquid-crystal shutter 301 to a value close to that of a transparent body, as shown in FIG. 15, when, for example, the above-mentioned liquid-crystal shutter 301 is used. It is also possible to resume controlling the transmissivity of the liquid-crystal shutter 301 based on the above by closing the switch 392.

Another option is to connect the HMD 1 pertaining to the present embodiment with a holding device that puts the game in a pause mode when the visor 80 has been opened.

It is also possible to connect the HMD 1 pertaining to the present embodiment with a visor forced release device for automatically and forcibly opening the visor 80 on the basis of an arbitrarily set elapsed time. Connecting this visor forced release device makes it possible to be fully aware of the external environment at regular intervals and to periodically end image viewing.

In addition, according to the description of the present embodiment, a fluorescent tube 71 was used as a light source for the display device 2, and a housing 79 accommodated this tube and a light guide plate 72. This is not the only option, however. It is also possible to provide other light sources and to install a reflection plate or the like instead of the light guide plate 72. Furthermore, the housing shape is not limited to the one described above.

The present embodiment also refers to a connecting device 30 comprising first engagement members 50A and 50B, and second engagement members 60A and 60B. This is not the only option, however, and the connecting device pertaining to the present invention can have any structure that allows the front frame and the back frame to be connected while being allowed to move to the front and back of the head.

The present embodiment also refers to a belt fastening device comprising a pinion 34 in engagement with the racks 32A and 32B provided at the two ends of belts 16A and 16B. This is not the only option, however, and the belt fastening device pertaining to the present invention can have any structure as long as the belts 16A and 16B can be fastened by adjusting the length of the belts 16A and 16B.

The present embodiment also refers to a case in which screws or other fixing members are used to attach and detach the main body 120B of the front frame 12 and the outside component 120A of the front frame 12, as well as the main body 140B of the back frame 14 and the outside component 140A of the back frame 14. This is not the only option, however. It is also possible to provide mutually engaging engagement components to the main body 120B of the front frame 12 (main body 140B of the back frame 14) and to the outside component 120A of the front frame 12 (outside component 140A of the back frame 14), and to detachably fix the two parts to each other by engaging these engagement components, or to adopt some other method. Another option is not to divide the main body of the frame and the outside components of the frame.

(Second Embodiment)

Figure 18:
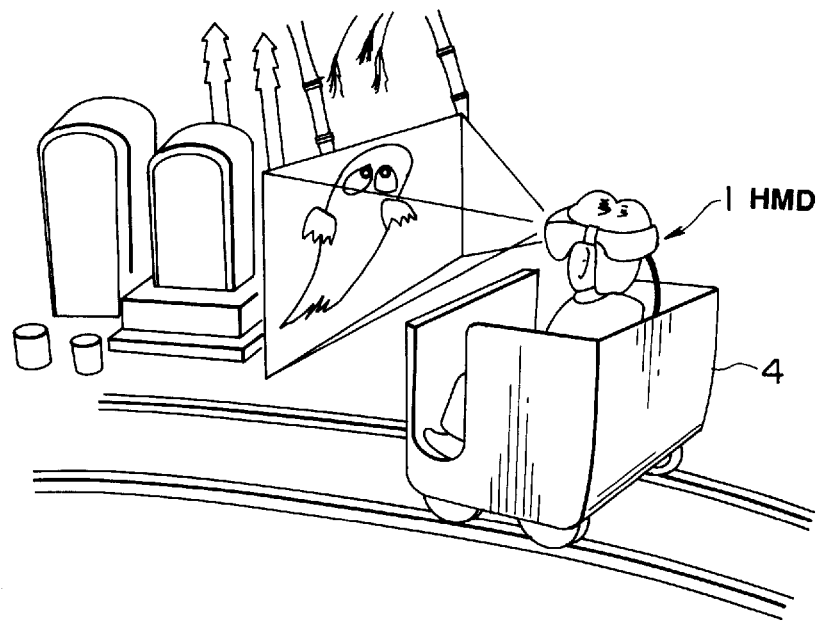
FIG. 18 is a conceptual diagram of the HMD system pertaining to a second embodiment of the present invention.
Figure 19:
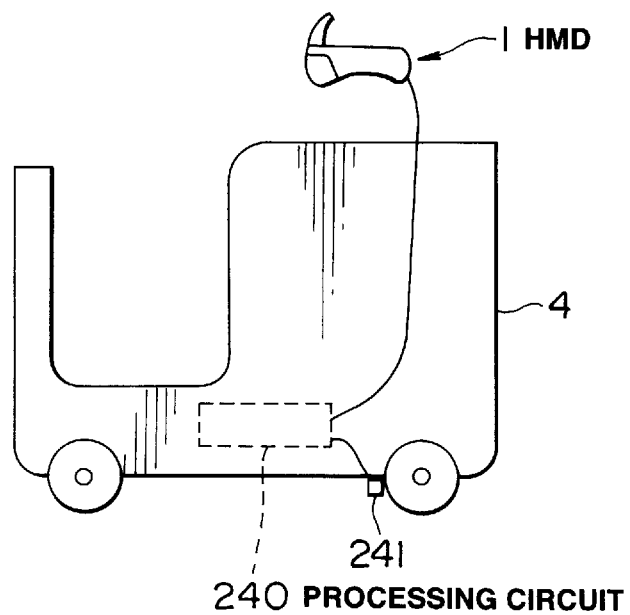
FIG. 19 is a schematic showing the device structure of the HMD system pertaining to the second embodiment of the present invention.

The HMD system pertaining to a second embodiment will now be described. The HMD system pertaining to this embodiment is configured using the HMD pertaining to the first embodiment described above. FIGS. 18 and 19 are conceptual diagrams of the HMD system pertaining to the present embodiment. This HMD system is used at a haunted house at an amusement park. Rails are laid across a site where a haunted house is recreated, and carriages 4 run on these rails. A carriage 4 is equipped with a processing circuit 240 for generating images and the like, a sensor 241 for detecting the rotation of the wheels, and the like. An HMD 1 is connected to the processing circuit 240, and images that correspond to the position of the carriage 4 and to the direction of the player's head are projected on the HMD 1. As described above, this HMD 1 allows images projected on the HMD 1 to be superposed on the images of the real space. A player wearing the HMD 1 can therefore superpose, for example, an image of a ghost projected on the HMD 1 and the haunted house occupying the real space, making a vivid image presentation possible.

Figure 20:
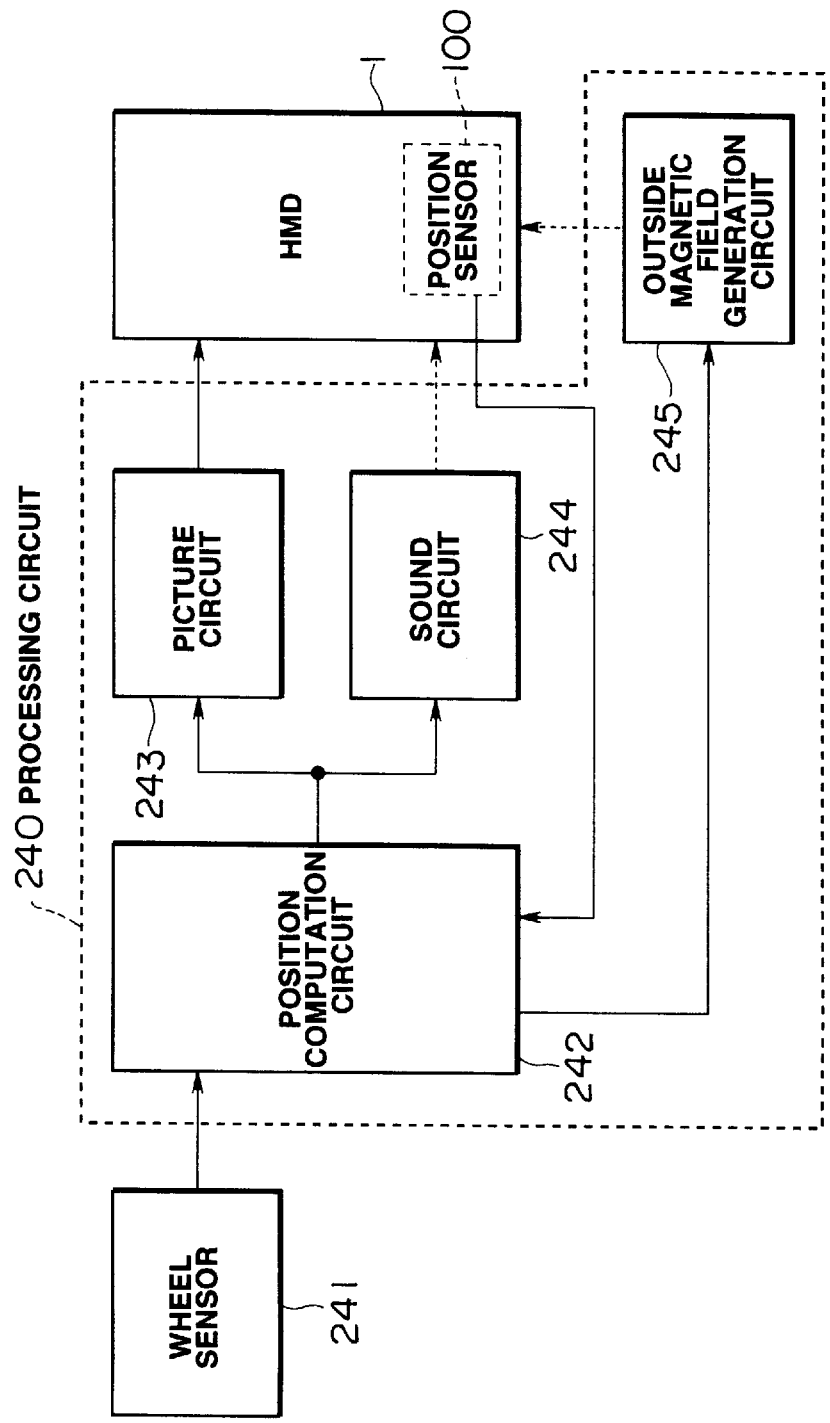
FIG. 20 is a schematic block diagram of the HMD system pertaining to the second embodiment of the present invention.

FIG. 20 is a block diagram of the HMD system pertaining to the present embodiment. The wheel sensor 241 shown in the figure detects the rotational speed of the wheels installed under the carriage. The data outputted from the wheel sensor 241 are inputted to the processing circuit 240. The processing circuit 240 comprises a position computation circuit 242, a picture circuit 243, a sound circuit 244, and an outside magnetic field generation circuit 245.

The position computation circuit 242 performs the function of outputting positional data expressing the position of the player in the haunted house and the position (including the direction) of the player's head in the carriage 4 on the basis of data outputted from the wheel sensor 241 and a position sensor 100. The positional data outputted from the position computation circuit 242 are inputted to the picture circuit 243 and sound circuit 244. Based on the positional data, the picture circuit 243 generates video signals representing, for example, ghosts, and sends them to the HMD 1. In addition, the sound circuit 244 generates prescribed sound effects based on the positional data.

The outside magnetic field generation circuit 245 performs the function of generating a measuring magnetic field inside the carriage 4 in accordance with instructions from the position computation circuit 242. The position sensor 100 attached to the HMD 1 detects this measuring magnetic field and feeds a prescribed detection voltage back to the position computation circuit 242. This allows the position computation circuit 242 to determine the position of the HMD 1 inside the carriage 4. The position sensor 100 is attached to the HMD 1.

Figure 21:
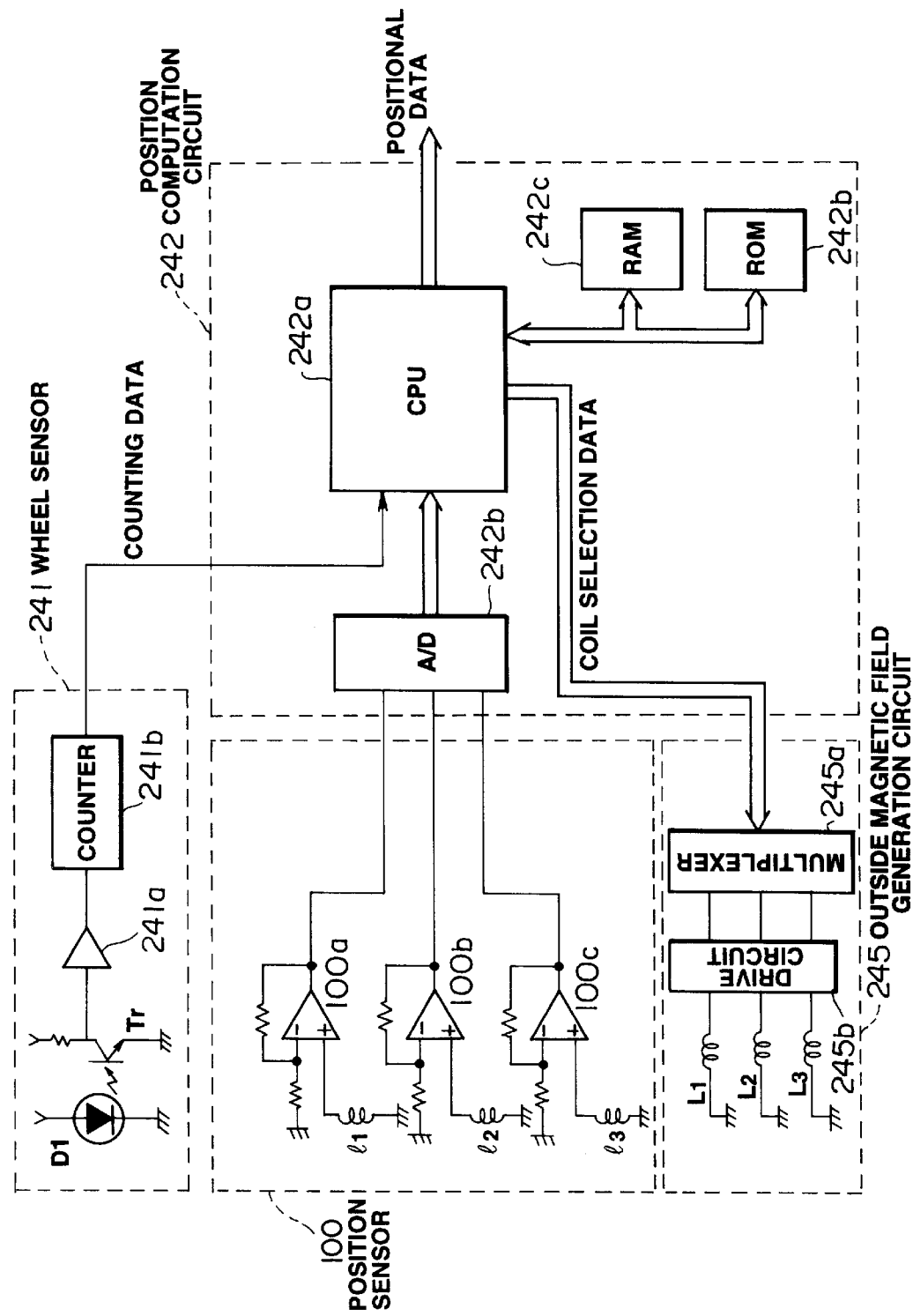
FIG. 21 is a block diagram showing the details of the axle sensor, position computation circuit, outside magnetic field generation circuit, and position sensor pertaining to the second embodiment of the present invention.

FIG. 21 is a diagram showing the details of the wheel sensor 241, position computation circuit 242, outside magnetic field generation circuit 245, and position sensor 100.

The wheel sensor 241 comprises a light-emitting diode D1 for light emission, a phototransistor Tr1 for light detection, an inverter 241a, a counter 241b, and the like. The light-emitting diode D1 and phototransistor Tr1 are placed on both sides of a wheel. Slits are formed in the wheel, and as the wheel rotates, light emitted by the light-emitting diode D1 intermittently reaches the phototransistor Tr1. This generates a pulse voltage at the collector terminal of the phototransistor Tr1, and this pulse voltage is inputted to the counter 241b after a waveform is formed by the inverter 241a. The counter 241b performs the function of counting the leading or trailing edges of the pulse voltage. The counting data values outputted from the counter 241b are therefore gradually accumulated as the carriage 4 moves along the rails. Specifically, the position of the carriage 4 along the rails can be computed using these counting data as reference.

Figure 24:
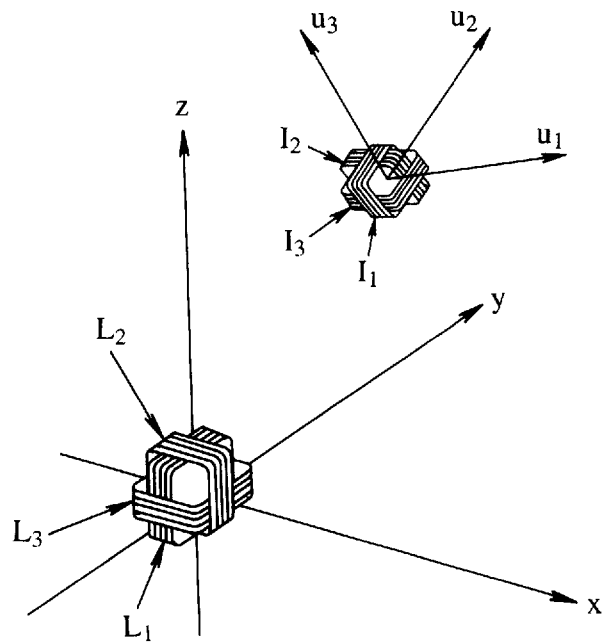
FIG. 24 is a diagram illustrating the magnetic field generating coil and magnetic field detecting coil pertaining to the second embodiment of the present invention.

The outside magnetic field generation circuit 245 comprises a multiplexer 245a, a drive circuit 245b, and magnetic field generating coils L1, L2, and L3. The multiplexer 245a activates any of the three output lines in accordance with the coil selection data outputted from the position computation circuit 242. The drive circuit 245b comprises a transistor switch, a thyristor, or the like and performs the function of passing an electric current through any of the magnetic field generating coils L1 through L3. Specifically, the drive circuit 245b can pass an electric current through a magnetic field generating coil L1, L2, or L3, depending on which of the three output lines of the multiplexer 245a has been activated. The magnetic field generating coils L1 through L3 are wound in such a way that they are orthogonal to each other (FIG. 24). A magnetic field can therefore be generated in the directions along the X-, Y-, and Z-axes one after another by passing an electric current through the magnetic field generating coils L1 through L3 one after another.

The position sensor 100 comprises magnetic field detecting coils 11, 12, and 13, and operational amplifiers 100a, 100b, and 100c. The magnetic field detecting coils 11 through 13 are wound in such a way that they are orthogonal to each other (FIG. 24). A prescribed induced voltage is generated in the magnetic field detecting coils 11 through 13 by placing these magnetic field detecting coils 11 through 13 in the magnetic field generated by the magnetic field generating coils L1 through L3. The operational amplifiers 100a through 100c are feedback amplifiers for amplifying the induced voltage generated in the magnetic field detecting coils 11 through 13. The output voltage of the operational amplifiers 100a through 100c is inputted to an A/D converter 242b inside the position computation circuit 242.

The position computation circuit 242 comprises a CPU 242a for computing positional data, an A/D converter 242b for converting the output voltage of the position sensor 100 into digital signals, an RAM 242c used as a work memory for the CPU 242a, and an ROM 242d that stores program memory. Based on the counting data outputted from the wheel sensor 241, the CPU 242a performs computation for the carriage 4 moving along the rails, and computes the position and angle of the HMD 1 inside the carriage 4 based on the induced voltage that has been converted to digital signals. The computation results are outputted as positional data to the picture circuit 243 and sound circuit 244.

Figure 22:
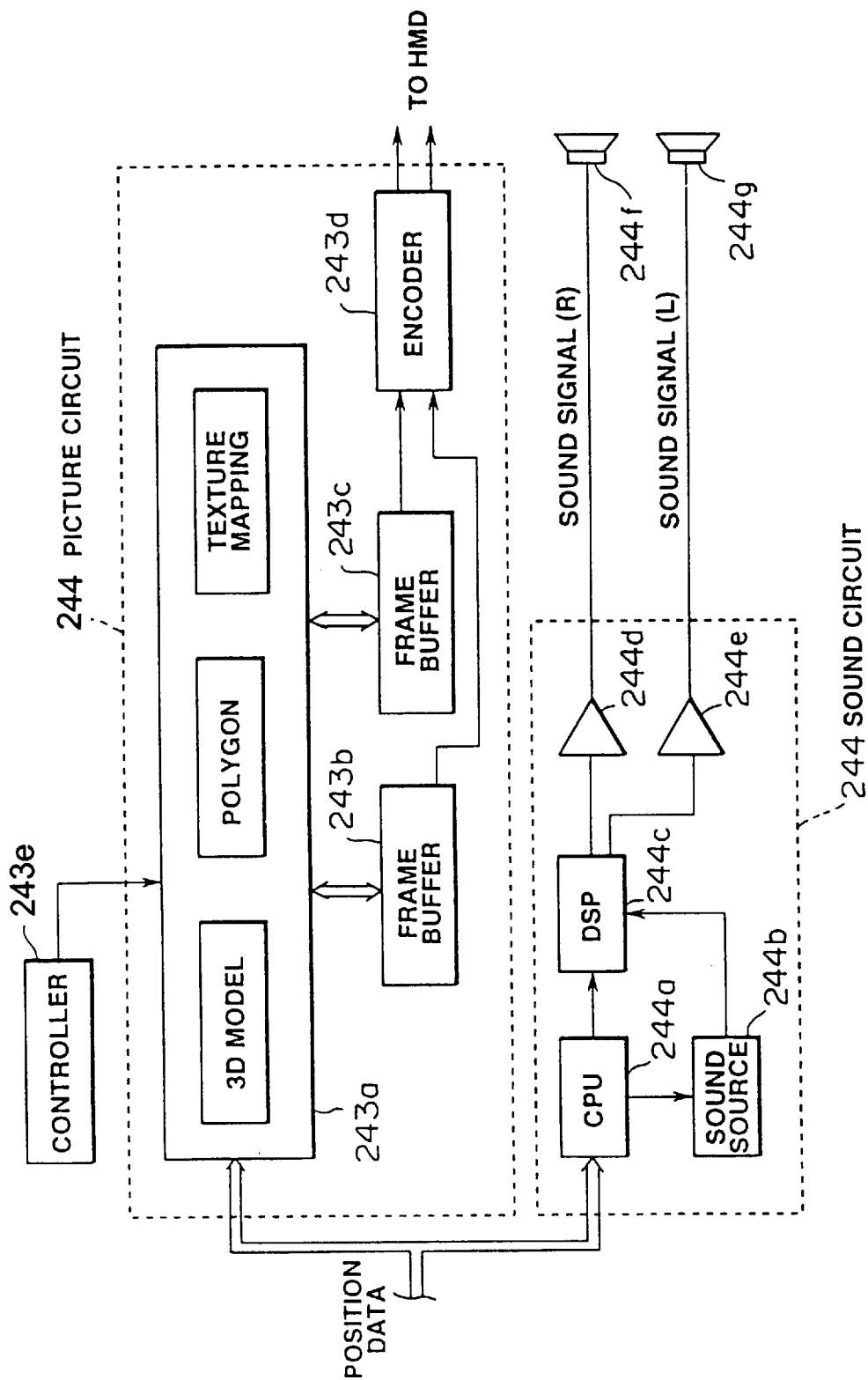
FIG. 22 is a block diagram showing the details of the picture circuit and sound circuit pertaining to the second embodiment of the present invention.

FIG. 22 is a block diagram depicting the picture circuit 243 and sound circuit 244. The picture circuit 243 comprises an image generating CPU 243a, a right-side (right-eye) frame buffer 243b, a left-side (left-eye) frame buffer 243c, and an encoder 243d for converting picture data into video signals. The CPU 243a generates the desired stereoscopic pictures on the basis of the positional data outputted from the position computation circuit 242. Specifically, based on the positional data, the CPU 243a generates three-dimensional models of pictures, generates polygon data, and performs a texture mapping routine. Generated by these routines, picture data for the right eye and picture data for the left eye are stored in the frame buffers 243b and 243c. The encoder 243d generates video signals by adding sync signals or the like to the picture data stored in the frame buffers 243b and 243c. Video signals for the right and left eyes are sent separately to the HMD 1. A controller 243e may be connected to the picture circuit 243, and the picture controlled based on data from the controller 243e. Specifically, by operating the controller 243e, the player can perform a routine aimed at destroying the ghost projected on the HMD 1.

The sound circuit 244 comprises a CPU 244a for performing sound routines based on positional data, a sound source 244b that stores PCM data and the like, a DSP (Digital Signal Processor) 244c for performing reverberation and other sound-field routines, audio amplifiers 244d and 244e, and the like. Left and right sound signals (R, L) are outputted from the audio amplifiers 244d and 244e, and outside speakers 244f and 244g are driven. The audio signals may also be outputted to a speaker built into the HMD 1.

Figure 23:
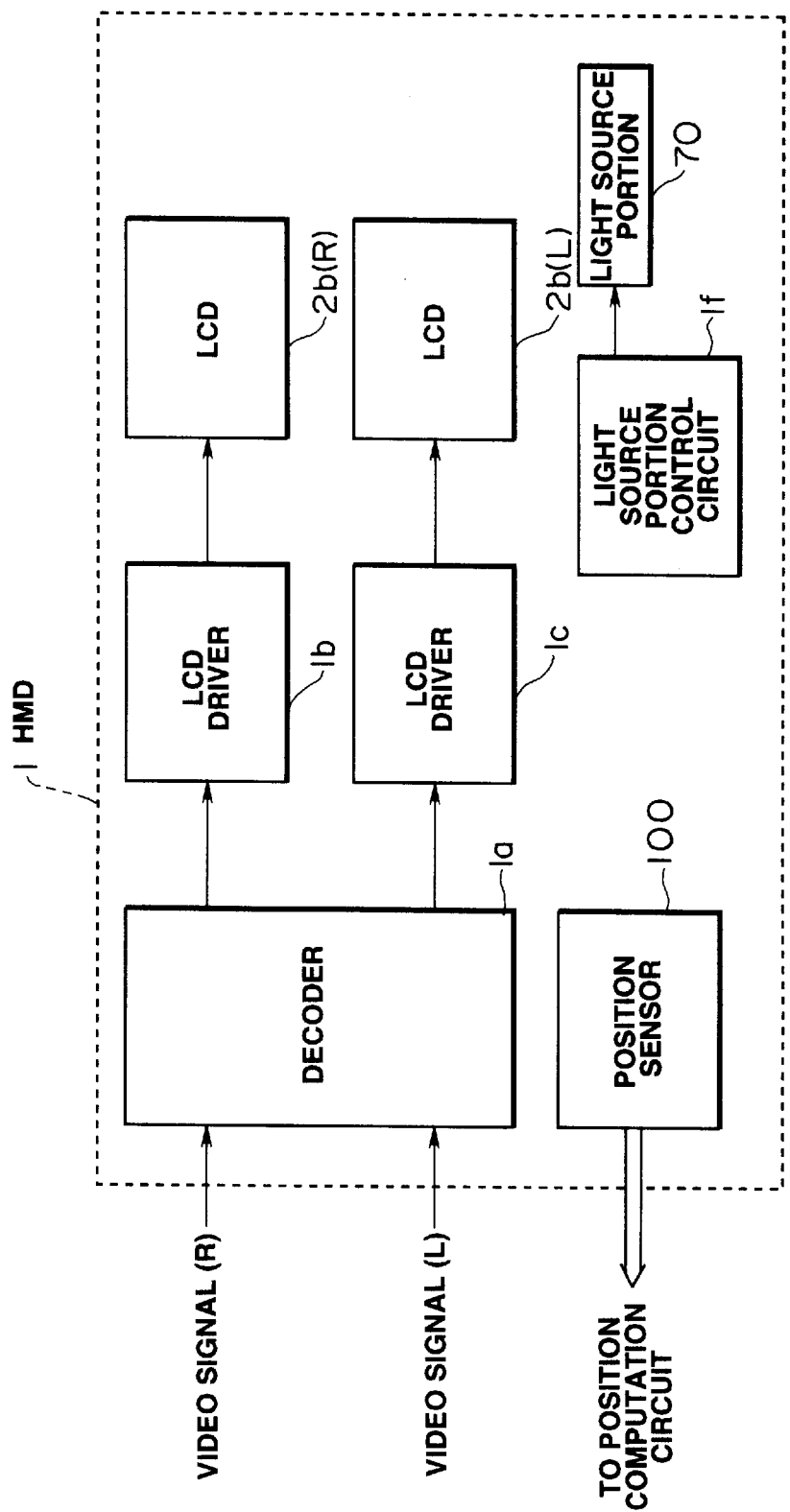
FIG. 23 is a block diagram of the HMD pertaining to the second embodiment of the present invention.

FIG. 23 is a block diagram of the HMD 1. In this figure, a decoder 1a separates sync signals, separates brightness signals and color signals, and performs other routines for the left and right video signals (R, L). An LCD driver 1b is a circuit for driving a right-side LCD 73R. Similarly, an LCD driver 1c is a circuit for driving a left-side LCD 73L. Two images in which parallax is taken into account are therefore displayed on the LCDs 73R and 73L, and the player can perceive stereoscopic images by observing these two images with his or her left and right eyes. A light source component control circuit 1f controls the luminous energy of the light source component 70 in accordance with the ambient brightness. Specifically, the light source component control circuit 1f increases the luminous energy of the light source component 70 when the surroundings are bright, and reduces the luminous energy of the light source component 70 when the surroundings are dark. This makes it possible to always keep constant the ratio of the brightness of the images projected on the HMD 1 and the brightness of the surrounding images.

Figure 26:
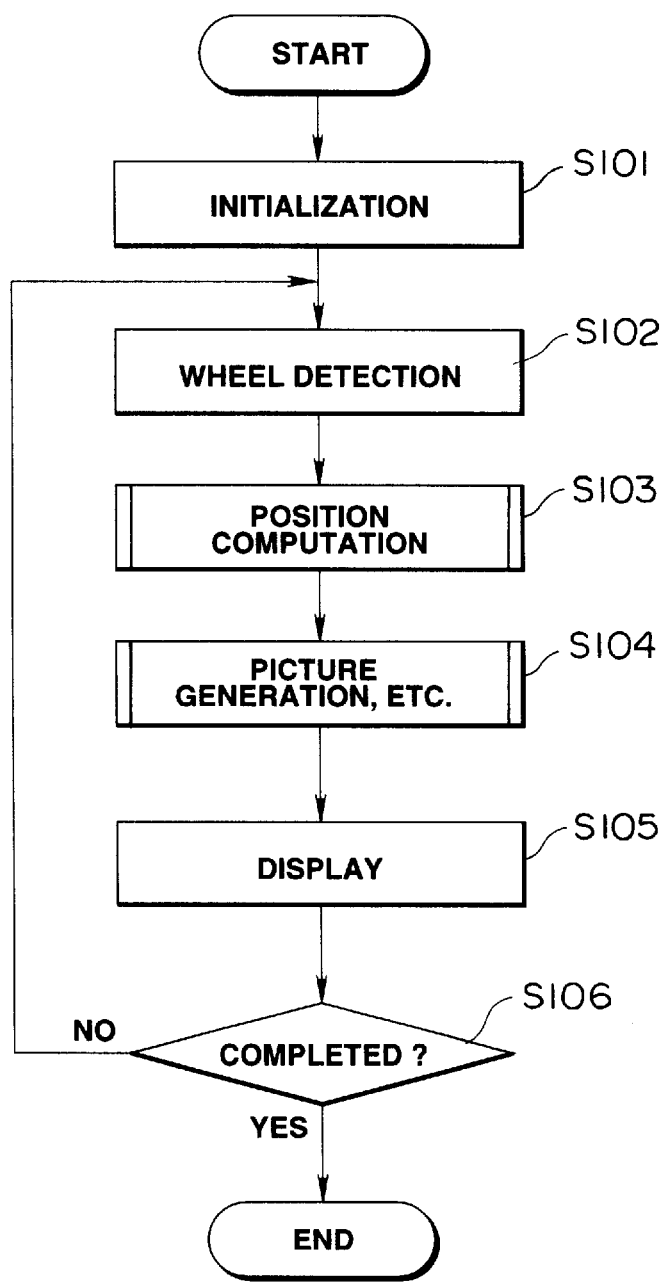
FIG. 26 is a main flow chart depicting the action of the HMD system pertaining to the second embodiment of the present invention.

FIG. 26 is a main flow chart depicting the action of the present embodiment. First, a player boards a carriage 4 at the starting point of a haunted house. An HMD 1 is placed on the head of the player. At this time, the processing circuit 240, that is, the wheel sensor 241, position computation circuit 242, picture circuit 243, sound circuit 244, and the like, perform the initialization routine (S 101). For example, the wheel sensor 241 resets the counting data expressing the cumulative number of rotations of the wheels. In addition, the position computation circuit 242 clears the RAM 242c and resets the positional data expressing the position and direction of the HMD 1.

After the above-mentioned initialization routine has been completed, the carriage 4 slowly starts moving along the rails. The movement of the carriage 4 is accompanied by the rotation of the wheels, at which time the wheel sensor 241 counts the number of rotations of the wheels. Specifically, the rotation of the wheel intermittently disrupts the optical path between the light-emitting diode D1 and the phototransistor Tr1, and pulses are outputted to the counter 241b. By counting the pulses, the counter 241b outputs counting data expressing the cumulative number of rotations of the wheel (S 102).

The position computation circuit 242 subsequently computes positional data expressing the position, direction, and other characteristics of the HMD 1 on the basis of the signals outputted from the position sensor 100 and the counting data outputted from the wheel sensor 241 (S 103). The picture circuit 243 then generates prescribed video signals on the basis of these positional data, and the sound circuit 244 generates prescribed sound effects (S 104). For example, the picture circuit 243 generates video signals representing a ghost when the carriage 4 goes past a cemetery, as shown in FIG. 18. The position computation subroutine in S 103 and the picture generation subroutine in S 104 will now be described.

The video signals generated in S 104 are sent to the HMD 1. The decoder 1a of the HMD 1 decodes the left and right video signals (R, L) and outputs brightness signals, color signals, sync signals, and the like to the LCD drivers 1b and 1c. The LCD drivers 1b and 1c display images on the corresponding LCDs 73R and 73L in accordance with the decoded brightness signals, color signals, and sync signals. As shown in FIG. 3, light emitted by the light source component 70 passes first through the 73R and 73L and then through the lens block 20, reaching the eyes of the player. Meanwhile, the background (outside light) of a cemetery or the like reaches the eyes of the player after passing through the visor 80 and lens block 20. To the eyes of the player, this creates the sensation that the image of a ghost in virtual space is superposed on the background of the cemetery in real space (S 105). This embodiment therefore makes it possible to create vivid image representations because images projected on the HMD 1 can be superposed on the background of a real space. In addition, images that correspond to the direction of the player's head are projected on the HMD 1, making it possible for the player to enjoy realistic images of a ghost appearing at a cemetery.

The processing circuit 240 then determines whether or not the carriage 4 has reached its destination (S 106). Specifically, the position computation circuit 242 determines whether or not the counting data outputted from the wheel sensor 241 have reached their maximum value. Routines that follow S 102 are repeatedly executed if the position computation circuit 242 determines that the carriage 4 has not reached its destination ("no" in S 106). Specifically, the position computation circuit 242 computes the position and direction of the HMD 1 on the basis of the counting data outputted from the wheel sensor 241 and on the basis of the induced voltage outputted from the position sensor. Images that correspond to the position and direction of the HMD 1 are then projected on the HMD 1. By contrast, all routines are completed if the position computation circuit 242 determines that the carriage 4 has reached its destination ("yes" in S 106).

Figure 25:
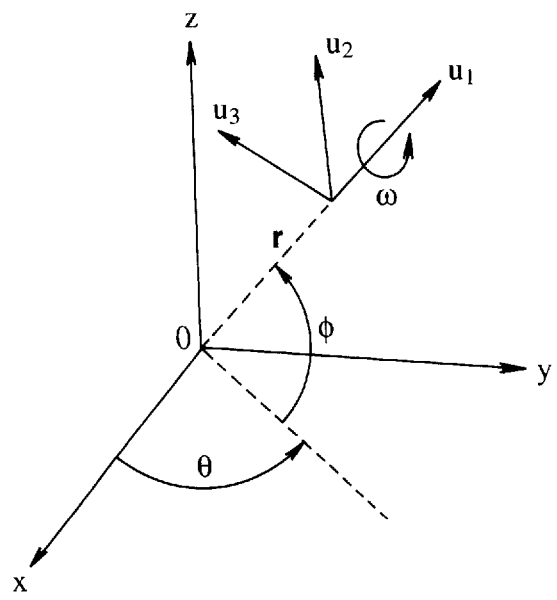
FIG. 25 is a diagram illustrating the magnetic field generating coil and magnetic field detecting coil pertaining to the second embodiment of the present invention.
Figure 27:
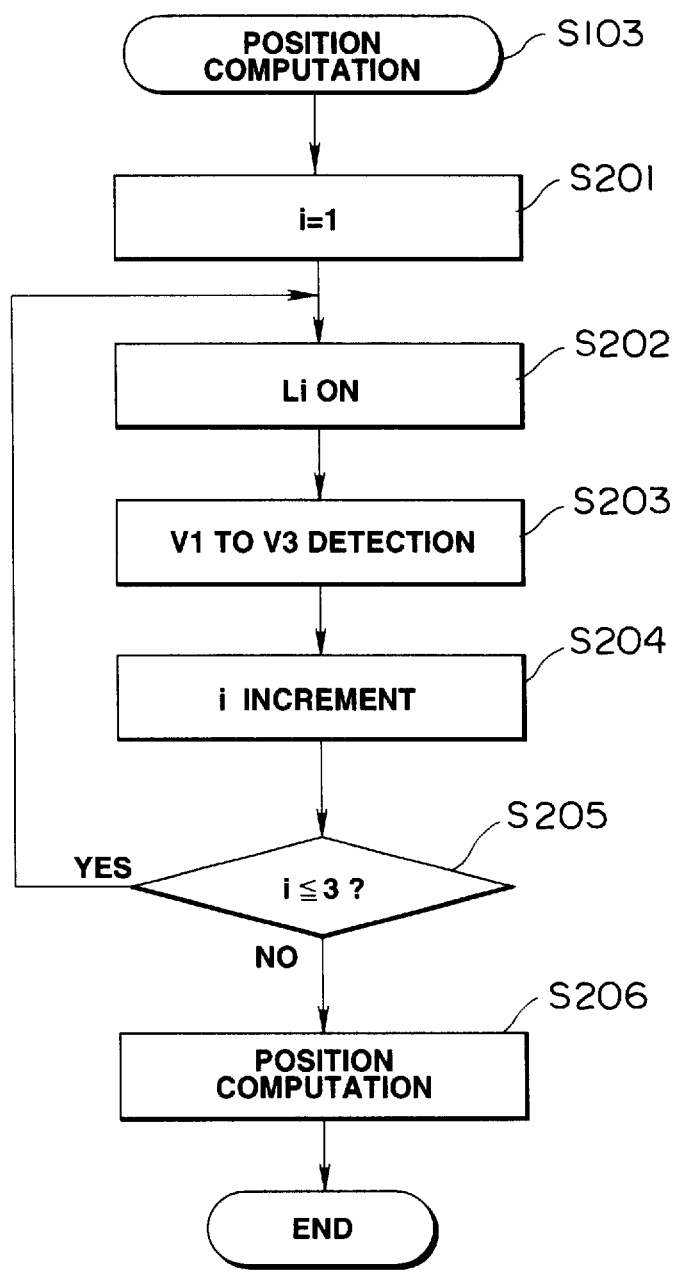
FIG. 27 is a flow chart depicting a position computation routine in the HMD system pertaining to the second embodiment of the present invention.

The above-mentioned position computation subroutine (S 103) will now be described with reference to FIG. 27. In this subroutine, the CPU 242a initializes a variable i by substituting "1" for the variable i (S 201). This variable i shows whether an electric current flows through any of the magnetic field generating coils L1 through L3. The CPU 242a then outputs coil selection data for the multiplexer and, of the three output lines of the multiplexer 245a, activates the first output line from above (FIG. 21). The drive circuit 245b passes an electric current through the magnetic field generating coil L1, which corresponds to this output line (S 202). This generates a magnetic field in the direction of the X-axis, as shown in FIGS. 24 and 25. This is accompanied by the generation of induced voltages V1, V2, and V3 in the respective magnetic field detecting coils 11 through 13. These voltages correspond to the angles $\theta$, $\phi$, and $\omega$ of the magnetic field detecting coils 11 through 13 and to the distance r between the magnetic field generating coils L1 through L3 and the magnetic field detecting coils 11 through 13.

The induced voltages V1 through V3 generated in the corresponding magnetic field detecting coils 11 through 13 are amplified by the operational amplifiers 100a through 100c and then inputted to the position computation circuit 242. These induced voltages V1 through V3 are converted to digital signals by the A/D converter 242b and then stored in the RAM 242c.

The CPU 242a subsequently subjects the variable i to incremental change (S 204), and then determines whether or not the variable i is equal to or less than 3 (S 205). Because in the case under consideration the variable i is equal to 2 ("yes" in S 205), the CPU 242a returns to S 202. In S 202, the CPU 242a outputs prescribed coil selection data to the multiplexer 245a, and the drive circuit 245b passes an electric current through the magnetic field generating coil L2. The CPU 242a detects the induced voltages V1 through V3 generated in the magnetic field detecting coils 11 through 13, and data expressing these induced voltages V1, V2, and V3 are stored in the RAM 242c (S 203). The CPU 242a subsequently subjects the variable i to incremental change (S 204), and then determines whether or not the variable i is equal to or less than 3. Because in the case under consideration the variable i is equal to 3, routines that follow S 202 are executed.

When induced voltages V1, V2, and V3 are determined by the above routines for the corresponding variables (i=1 through 3), the decision outcome in S 205 is "no," and routines that follow S 206 are executed. The CPU 242a calculates the angles $\theta$, $\phi$, and $\omega$ and the distance r on the basis of a total of nine induced voltages V1, V2, and V3 stored in the RAM 242c. This yields the direction and position of the magnetic field detection coils, that is, the direction and position of the HMD 1 inside the carriage 4. The CPU 242a then computes the position of the carriage 4 along the rails and the direction and position of the HMD 1 inside the carriage 4 on the basis of these values and the counting data outputted from the wheel sensor 241 (S 206). The CPU 242a then returns to the main flow chart of FIG. 26.

Figure 28:
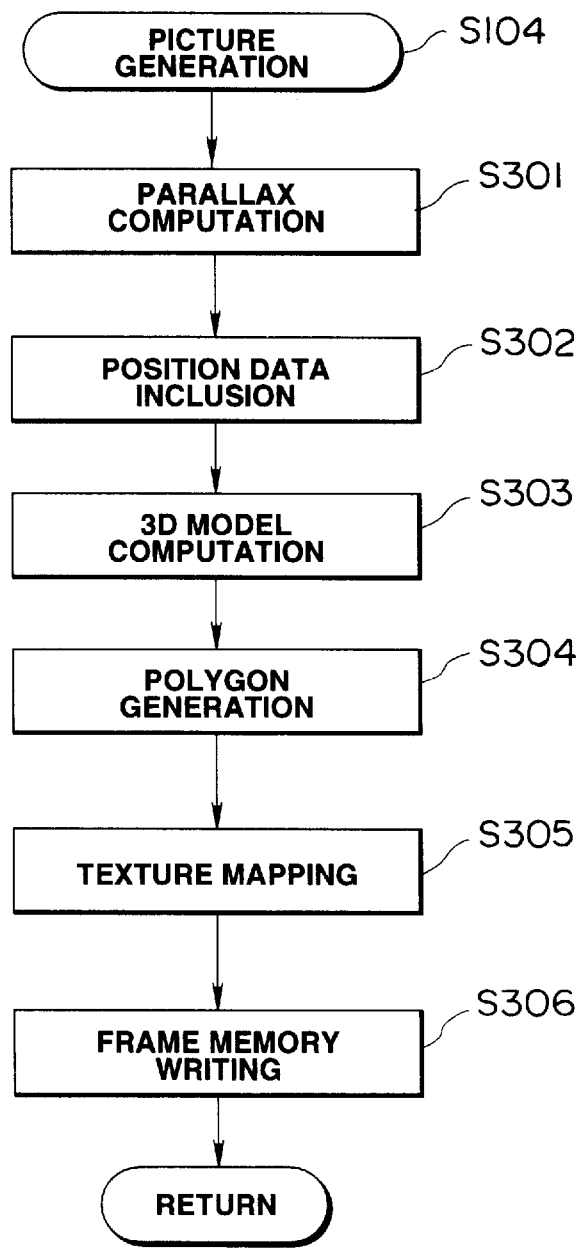
FIG. 28 is a flow chart depicting an image generation routine in the HMD system pertaining to the second embodiment of the present invention.

The above-mentioned picture generation subroutine (S 104) will now be described with reference to FIG. 28. In this flow chart, the CPU 243a first retrieves from memory (not shown) data expressing the parallax of the left and right eyes (S 301). It is also possible to detect the distance between two lens blocks 20 with an adjustable interocular distance and to compute parallax data. The CPU 243a subsequently retrieves from the position computation circuit 242 positional data expressing the position, angle, and other characteristics of the HMD 1 (S 302) and generates a stereoscopic picture model in accordance with the positional data (S 303).

The stereoscopic picture model generated consists of left and right picture models in which the above-mentioned parallax data are taken into account. The CPU 243a generates polygon data in accordance with this stereoscopic picture model (S 304) and then subjects the polygon data to texture mapping (S 305). This yields data expressing left and right pictures, and the data expressing the two pictures generated are stored in the frame buffers 243b and 243c (S 306). The CPU 243a then returns to the main flow chart in FIG. 26.

As described above, the present embodiment allows images of ghosts and other objects projected on an HMD to be superposed on the background of a cemetery or other location existing in real space, making more vivid image presentations possible. In addition, real-time generation of images projected on the HMD in conjunction with the direction of the HMD allows the player to experience a convincing sensation of being present at a cemetery. As a result, a realistic virtual space can be created.

(Third Embodiment)

Figure 29:
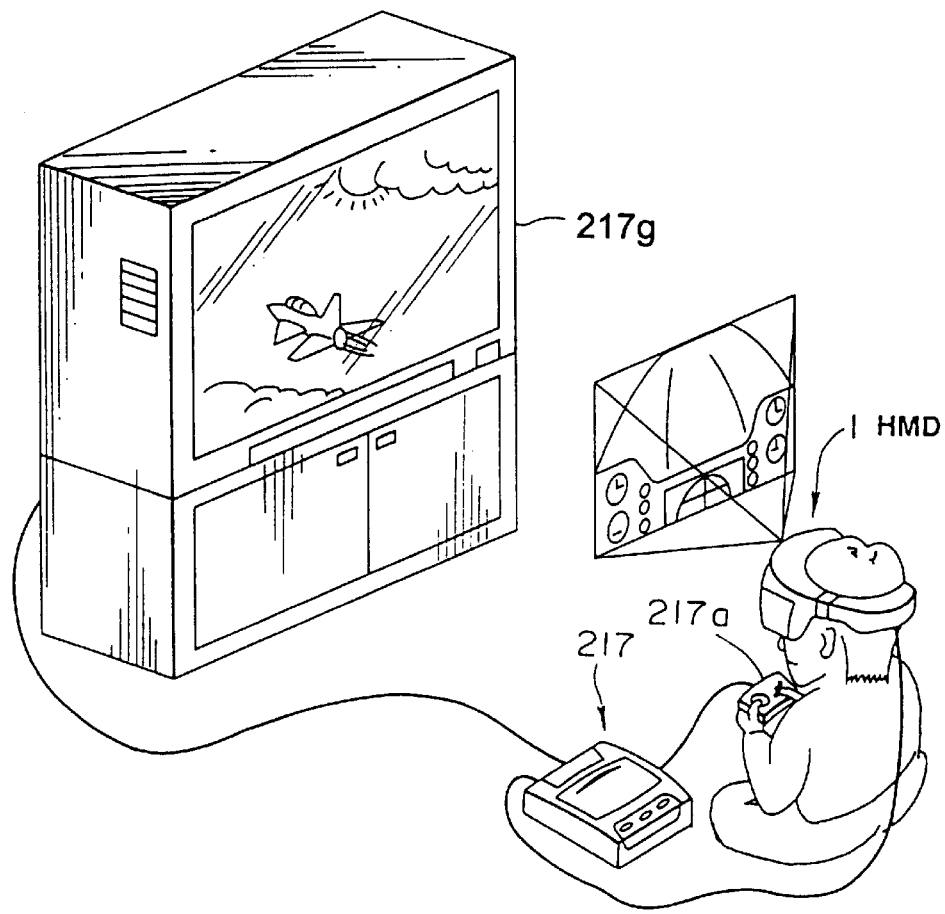
FIG. 29 is a conceptual diagram of the HMD system pertaining to a third embodiment of the present invention.
Figure 30:
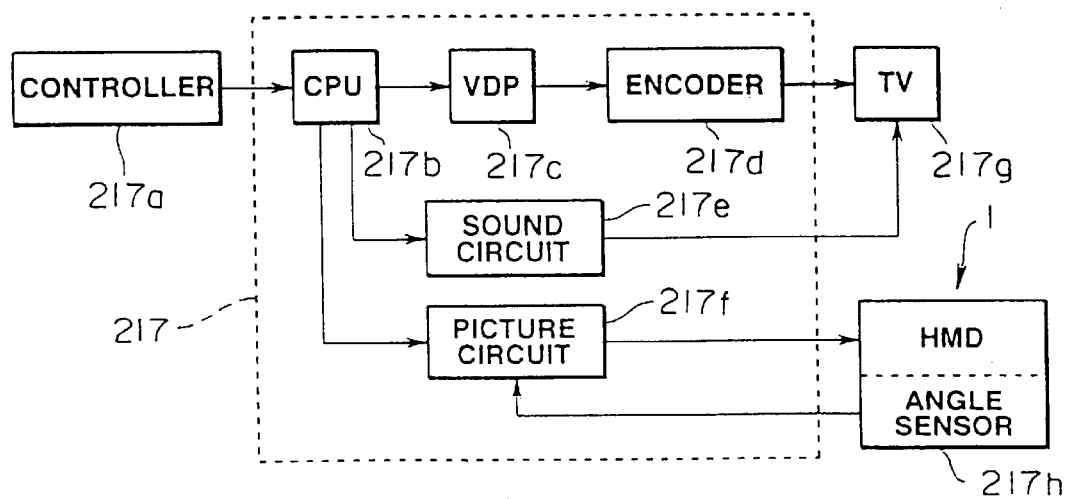
FIG. 30 is a schematic block diagram of the HMD system pertaining to the third embodiment of the present invention.

A third embodiment of the present invention will now be described with reference to FIGS. 29 and 30. The HMD system pertaining to this embodiment is configured using the HMD pertaining to the first embodiment. FIG. 29 is a conceptual diagram of the HMD system pertaining to the present embodiment, and FIG. 30 is a block diagram of this HMD system. In these figures, a controller 217a, a TV receiver 217g, and an HMD 1 are connected to a TV gaming apparatus 217. This HMD system allows images projected on the HMD to be superposed on the pictures of a TV game.

The TV gaming apparatus 217 comprises a CPU 217b, a VDP 217c, an encoder 217d, a sound circuit 217e, and a picture circuit 217f. The CPU 217b runs application software on the basis of the operating contents of the controller 217a. The VDP (Video Display Processor) 217c performs the function of generating prescribed game scenes in accordance with instructions from the CPU 217b. The encoder 217d converts the game scenes generated by the VDP 217c into video signals based on NTSC or the like. The video signals outputted from the encoder 217d are inputted to the TV receiver 217g, and as a result, prescribed game scenes are displayed on the TV receiver 217g. As shown, for example, in FIG. 29, pictures of a fighter aircraft flying across the sky are displayed on the TV receiver 217g when application software for a shooting game is used. Sound effects created by the sound circuit 217e are outputted at the same time from the speakers of the TV receiver 217g.

The HMD 1 has the same structure as that in the first embodiment above, except that an angle sensor 217h is installed instead of the position sensor 100. The angle sensor 217h, which consists of a gyro rotated by a motor, allows the angle of the HMD 1 to be detected using gyro inertia. The picture circuit 217f performs the function of generating images that correspond to the angle of the angle sensor 217h. Specifically, the picture circuit 217f detects signals outputted from the angle sensor 217h and computes the angle of the HMD 1. The picture circuit 217f generates prescribed pictures on the basis of the computation results, and the pictures generated are outputted to the HMD 1. With an application software for a shooting game, for example, a picture of the cockpit of a fighter aircraft is projected on the HMD 1, as shown in FIG. 29. The picture of the cockpit projected on the HMD 1 is therefore superposed on the picture of the fighter aircraft projected on the TV receiver 217g.

Because conventional TV gaming apparatus project images only on TV receivers, it is difficult to create images that have depth. The present embodiment, however, allows one to create images that appear to have depth because it is possible to superpose the images of the HMD 1 directly in front of the player's eyes on the images of the TV receiver at a distance from the player.

It is also possible to send the desired video signals to the TV gaming apparatus 217 using a VTR (Video Tape Recorder) instead of the TV gaming apparatus 217. This arrangement allows the images projected on the HMD 1 to be superposed on the images played back by the VTR.

(Fourth Embodiment)

Figure 31:
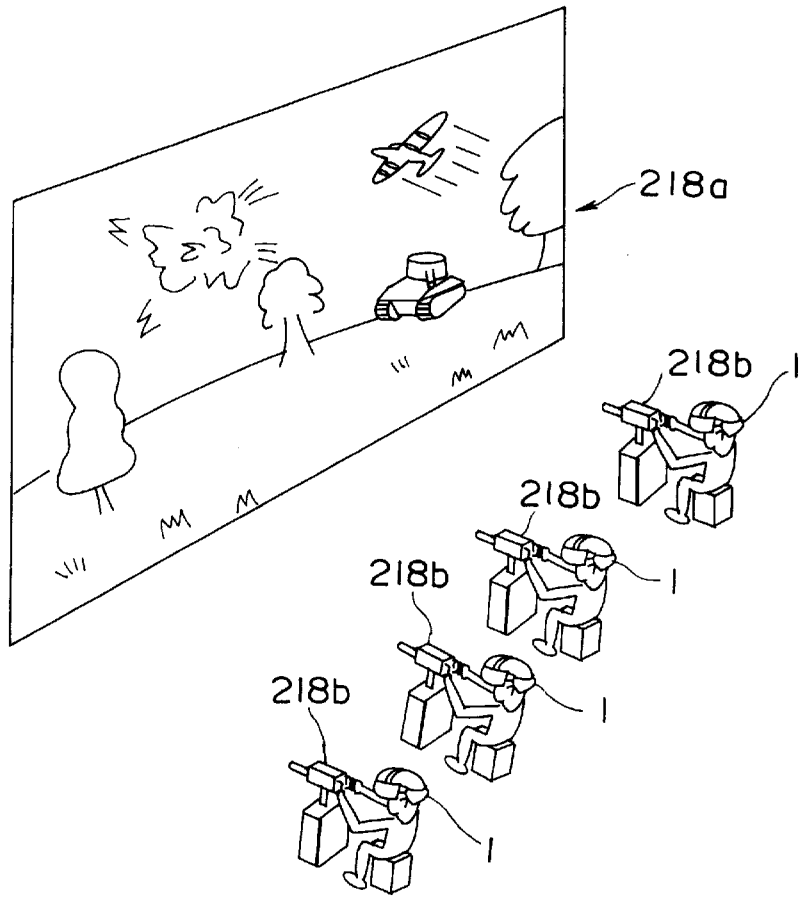
FIG. 31 is a schematic of the HMD system pertaining to a fourth embodiment of the present invention.

The HMD system pertaining to a fourth embodiment will now be described with reference to FIGS. 31, 32, and 33. This HMD system is obtained by applying the HMD pertaining to the first embodiment to a shooting game at an amusement park. In FIG. 31, a screen 218a onto which a battle scene is projected is located in front of a plurality of players. The images on this screen 218a are projected with the aid of a projector. Individual players shoot down targets on the screen 218a by operating controllers 218b shaped as guns, and this makes competition among the players possible. An HMD 1 is mounted on the head of each player, and the score of the corresponding player is displayed on each HMD 1 (right side of FIG. 32).

Figure 33:
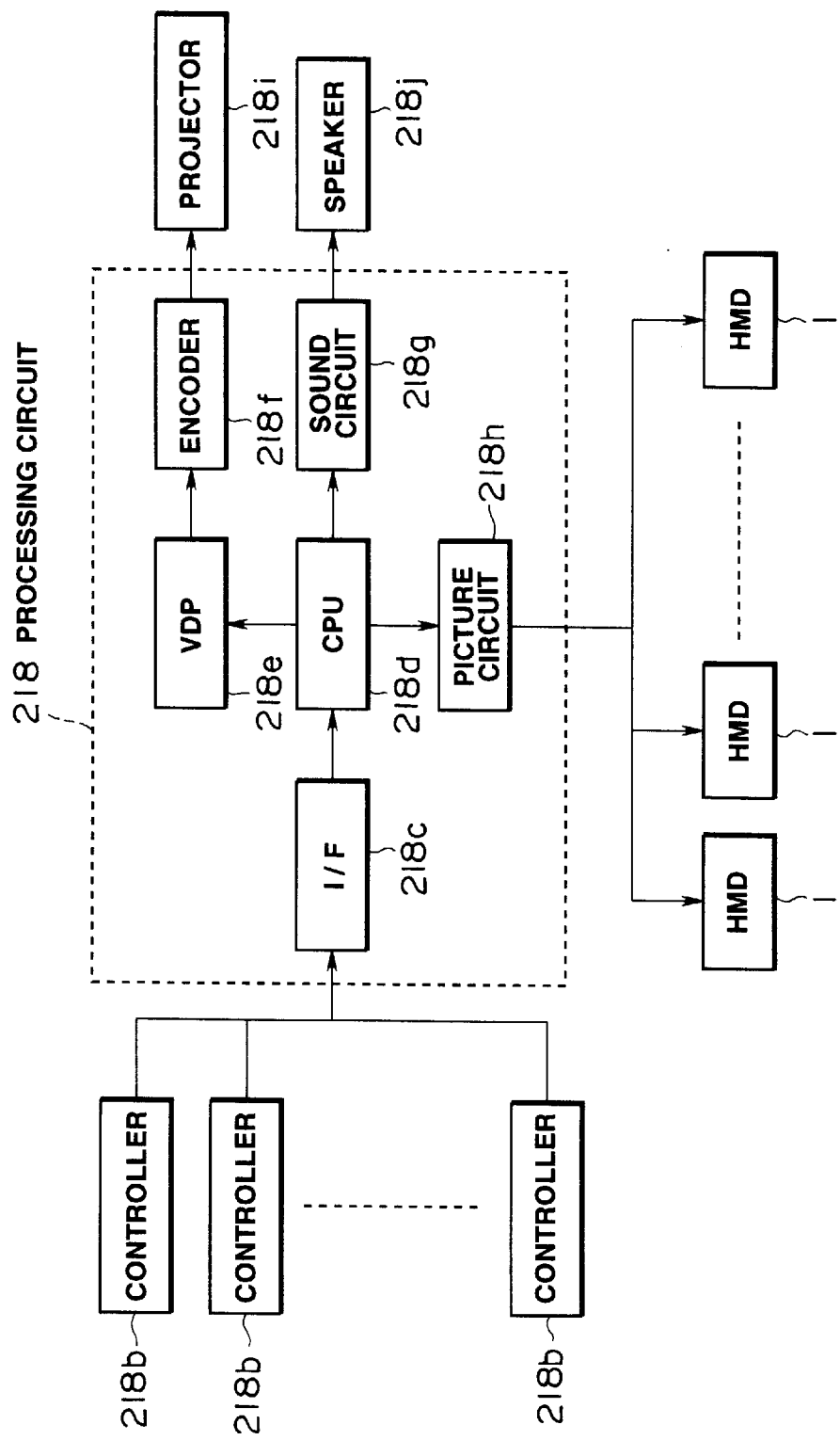
FIG. 33 is a schematic block diagram of the HMD system pertaining to the fourth embodiment of the present invention.

The structure of this HMD system is schematically shown in FIG. 33. This HMD system comprises a plurality of controllers 218b shaped as guns, a processing device 218 for game processing, a projector 218i for projecting the battle scene onto the screen 218a, a speaker 218j for creating sound effects, a plurality of HMDs 1 mounted on the heads of the players, and the like.

Data outputted from the controllers 218b are inputted to an I/F 218c in the processing device 218. The I/F 218c consecutively reads and scans the data outputted from the plurality of controllers 218b. Operating in accordance with a preset application program, a CPU 218d executes a game routine that corresponds to the data read via the I/F 218c. The VDP 218e generates prescribed pictures (battle scenes) in accordance with the processing contents of the CPU 218d. The pictures generated are outputted to the projector 218i via an encoder 218f. The projector 218i is a device for enlarging and projecting on the screen 218a pictures displayed on a CRT or liquid crystal. Each player can enjoy the shooting game by operating a controller 218b in the form of a gun while looking at the images projected on the screen 218a.

A picture circuit 218h performs the function of generating images that show the score of each player. For example, when a player shoots down an enemy aircraft on the screen 218a, a prescribed number of points are added to the score in the image corresponding to this player. Specifically, different images are generated for each player. Images generated by the picture circuit 218h are sent to each HMD 1, and each player can learn about his or her score by looking at the score displayed on his or her HMD 1. The present embodiment allows a player to see the picture on the screen 218a through an HMD 1 transparent to light, and to know only his or her score from the image projected on the HMD 1 (right side of FIG. 32).

Figure 32:
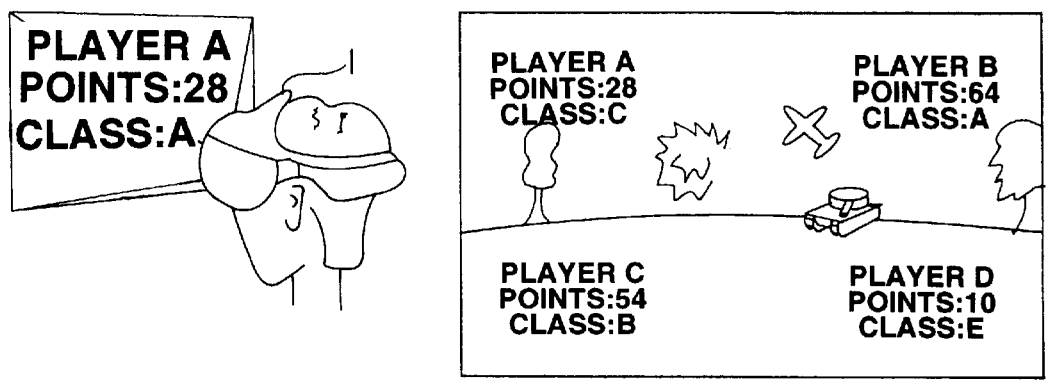
FIG. 32 is a diagram comparing the HMD system pertaining to the fourth embodiment of the present invention with a conventional example.

In the past, it was very difficult to see such a game scene because the scores of all the players were displayed on the screen 218a, as shown on the left side of FIG. 32. Other conventional embodiments involve the use of a small display designed to display the score and located on one side of the screen 218a. With such conventional embodiments, however, the players must shift their eyes between the screen 218a and the small display, and this impedes the game. In contrast to these conventional embodiments, the present embodiment does not require shifting the line of sight because the images of the HMD 1 can be seen superposed on the images on the screen 218a. It is also possible to avoid the problem of poor visibility of the pictures on the screen 218a by mounting an HMD 1 on each player and displaying the score for each player.

The present invention is not limited by the embodiments described above and can be implemented within a scope that does not deviate from the essence of the present invention.

For example, in the embodiments described above, the layout of the optical system of the display device 2 had the above-described structure. This is not the only option, however, and the layout of the optical system of the display device 2 can have any structure as long as the display device 2 is transparent and can project prescribed images. In addition, a display device such as that in which images are projected on a transparent screen can be used instead of LCDs.

What is claimed is:

1. A head mounted display, comprising:
   a transmission-type image display mechanism for displaying prescribed images while transmitting a quantity of outside light;
   a support mechanism for supporting the image display mechanism in front of a person's eyes; and
   a light attenuation mechanism for reducing the quantity of outside light incident on said image display mechanism,
   wherein said light attenuation mechanism is movable between a position covering an outside front surface of said image display mechanism and another position exposing said outside front surface,
   wherein said light attenuation mechanism includes means for detecting the quantity of outside light reaching the person's eyes and also includes means for controlling the transmissivity of the light attenuation mechanism on the basis of the quantity of outside light detected by said outside light quantity detecting means.

2. The head mounted display of claim 1, wherein the image display mechanism includes a light source and the quantity of outside light reaching the eyes through said light attenuation mechanism is less than that from said light source, and the quantity of outside light reaching the eyes without passing through said light attenuation mechanism is greater than that from said light source.

3. The head mounted display of claim 1, wherein said light attenuation mechanism comprises a visor that pivots up and down about two upper ends at respective sides of a person's head.

4. The head mounted display of claim 1, wherein said image display mechanism comprises:
   a liquid-crystal display;
   a display portion which displays images and is transparent to light; and
   a light guide plate having a side surface facing the light source and transmitting the light radiated by the light source to said display portion,
   wherein said liquid-crystal display is installed in a position roughly opposite to a central portion of a surface of the light guide plate, and said light guide plate is shaped substantially as a trapezoid in which a side close to said light source is shorter than an opposite side.

5. The head mounted display of claim 1, wherein said image display mechanism comprises:
   a liquid-crystal display;
   a display portion which displays images and is transparent to light;
   a diffusion plate positioned so that a surface faces the light source, diffuses the light radiated by the light source, and transmits the light to said liquid-crystal display; and
   a reflection plate surrounding said light source and reflecting light radiated by said light source toward said diffusion plate.

6. The head mounted display of claim 4, wherein said display portion comprises a liquid-crystal display.

7. The head mounted display of claim 1, wherein said image display mechanism further comprises:
   means for controlling the luminous energy radiated by the light source on the basis of the quantity of outside light detected by said outside light quantity detection means, said image display mechanism, when mounted in front of a person's eyes, is positioned along a line of sight while being tilted downward at a prescribed angle with respect to the horizontal direction.

8. A head mounted display, comprising:
a transmission-type image display mechanism for displaying prescribed images while transmitting a quantity of outside light;
a support mechanism for supporting the image display mechanism in front of a person's eyes;
a light attenuation mechanism for reducing the quantity of outside light incident on said image display mechanism;
means for detecting the position of said light attenuation mechanism; and
means for controlling power on/off according to the position of said light attenuation mechanism detected by the position detecting means,
wherein said light attenuation mechanism is movable between a position covering an outside front surface of said image display mechanism and another position exposing said outside front surface.

9. A head mounted display, comprising:
a transmission-type image display mechanism for displaying prescribed images while transmitting a quantity of outside light;
a support mechanism for supporting the image display mechanism in front of a person's eyes; and
a light attenuation mechanism for reducing the quantity of outside light incident on said image display mechanism; and
means for opening said light attenuation mechanism on the basis of an arbitrarily set elapsed time,
wherein said light attenuation mechanism is movable between a position covering an outside front surface of said image display mechanism and a position exposing said outside front surface.

10. The head mounted display of claim 1, wherein said support mechanism is provided with a headphone terminal and a headphone volume adjustment portion.

11. The head mounted display of claim 10, wherein said volume adjustment portion is installed in a front part of said support mechanism.

12. A head mounted display, comprising:
a transmission-type image display mechanism for displaying prescribed images while transmitting a quantity of outside light;
a support mechanism for supporting the image display mechanism on a person's head in front of a person's eyes; and
a light attenuation mechanism for reducing the quantity of outside light incident on said transmission-type image display mechanism,
wherein said image display mechanism, when mounted on the head, is positioned along a line of sight while being tilted downward at a prescribed angle with respect to the horizontal direction.

13. The head mounted display of claim 12, wherein said prescribed angle is 10 to 20 degrees.

14. The head mounted display of claim 1, further comprising:
an image display mechanism housing a light source portion for emitting light, a display portion which displays images and is transparent to a quantity of outside light, and an optical system for focusing on a person's eyes light transmitted from said light source portion to the display portion; and
a focus adjustment mechanism capable of varying the distance between said display portion and said optical system.

15. The head mounted display of claim 14, wherein said focus adjustment mechanism comprises:
cylindrical housings installed between said display portion and said optical system;
holding portions capable of moving up and down along an inner wall of the housing while holding said display portion;
a rotatable knob at least partially extending to the outside; and
a gear group for converting the rotational movement of said knob into a vertical movement of said holding portions.

16. The head mounted display of claim 15, wherein said focus adjustment mechanism is provided for each of left and right eyes.

17. The head mounted display of claim 16, wherein said holding portions are provided for both left and right eyes and are capable of being brought closer to each other or drawn apart from each other.

18. A transport device comprising:
the head mounted video display system of claim 1, comprising a transport device for transporting the wearer of said head mounted display;
a position detection device for detecting a position of the head mounted display and outputting positional data; and
a position detection device for detecting a position of the head mounted display and outputting positional data; and
a picture generation device for generating video signals that correspond to said positional data, and supplying these video signals to said head mounted display,
wherein said position detection device detects the position of said head mounted display and the position of said transport device, and outputs positional data, and
wherein said picture generation device generates, on the basis of said positional data, video signals that correspond to images displayed by said display mechanism.

19. The head mounted video display of claim 1, wherein said transmission-type image display mechanism comprises:
a light source;
a liquid-crystal display, through which light from the light source passes to create an image;
a lens for focusing the image leaving the liquid-crystal display;
a mirror having a first side for transmitting in a first direction the image leaving the liquid-crystal display and transmitting in a second direction a quantity of outside light, the first and second directions being substantially perpendicular to one another; and
a reflective lens for focusing and reflecting in the first direction the image transmitted through the mirror,
wherein the mirror has a second side for reflecting the image from the reflective lens in the second direction and for directing the image to a person's eyes together with the quantity of outside light.

20. A head mounted display, comprising:
a light source;

a transmission-type image display mechanism for displaying prescribed images while transmitting a quantity of outside light;

a support mechanism for supporting the image display mechanism in front of a person's eyes;

a light attenuation mechanism for reducing the quantity of outside light incident on ;aid image display mechanism;

means for detecting the position of said light attenuation mechanism; and means for controlling lighting of said light source according to the position of said light attenuation mechanism detected by the position detecting means;

wherein said light attenuation mechanism is movable between a position covering an outside front surface of said image display mechanism and another position exposing said outside front surface, and wherein the quantity of outside light reaching the eyes through said light attenuation mechanism is less than that from said light source, and the quantity of outside light reaching the eyes without passing through said light attenuation mechanism is greater than that from said light source.

21. The head mounted display of claim 20, wherein the image display mechanism includes a light source and the quantity of outside light reaching the eyes through said light attenuation mechanism is less than that from said light source, and the quantity of outside light reaching the eyes without passing through said light attenuation mechanism is greater than that from said light source.

22. A head mounted video display system, comprising:

a head mounted display equipped with a display mechanism which can transmit a quantity of outside light and which displays images based on supplied video signals;

a position detection device for detecting a position of the head mounted display and outputting positional data; and a picture generation device for generating video signals that correspond to said positional data and supplying these video signals to said head mounted display, wherein said picture generation device generates video signals that correspond to the background of the head mounted display surroundings on the basis of said positional data.

23. A head mounted video display system, comprising:

a plurality of head mounted displays, each including a display mechanism which can transmit a quantity of outside light and which displays images based on supplied video signals, a support mechanism for supporting the image display mechanism in front of a person's eyes, and a light attenuation mechanism for reducing the quantity of outside light incident on said image display mechanism, wherein said light attenuation mechanism is movable between a position covering an outside front surface of said image display mechanism and another position exposing said outside front surface; and a picture generation device for generating video signals that correspond to the images displayed by each of the display devices and for supplying these video signals to each of the plurality of head mounted displays, wherein said picture generation device supplies separate video signals to each of said head mounted displays.

* * * * *